(12) United States Patent
Bao et al.

(10) Patent No.: US 11,689,951 B2
(45) Date of Patent: Jun. 27, 2023

(54) MEASUREMENT GAP (MG) CONSIDERATION OF SIDELINK (SL)-ASSISTED POSITIONING

(71) Applicant: QUALCOMM Incorporated, San Diego, CA (US)

(72) Inventors: Jingchao Bao, San Diego, CA (US); Sony Akkarakaran, Poway, CA (US); Thien Nguyen, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 17/160,599

(22) Filed: Jan. 28, 2021

(65) Prior Publication Data
US 2022/0240118 A1 Jul. 28, 2022

(51) Int. Cl.
*H04L 12/00* (2006.01)
*H04W 24/10* (2009.01)
(Continued)

(52) U.S. Cl.
CPC .......... *H04W 24/10* (2013.01); *H04L 5/0051* (2013.01); *H04W 64/006* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2019/0230618 A1* | 7/2019 | Saur | G01S 5/02 |
| 2021/0329618 A1* | 10/2021 | Chervyakov | H04W 72/048 |
| 2022/0361137 A1* | 11/2022 | Baek | G01S 5/06 |

FOREIGN PATENT DOCUMENTS

| | | | | |
|---|---|---|---|---|
| WO | WO-2016048510 A1 | * | 3/2016 | G01S 5/0072 |
| WO | WO-2021030583 A1 | * | 2/2021 | G01S 5/0072 |
| WO | WO-2021057175 A1 | * | 4/2021 | H04L 5/0053 |

OTHER PUBLICATIONS

Interdigital Inc: "Discussion on End-to-End Latency Reduction for DL/UL Positioning", 3GPP Draft, 3GPP RAN WG2 Meeting #112-e, R2-2008886, 3rd Generation Partnership Project (3GPP), Mobile Competence Centre, 650, Route Des Lucioles, F-06921 Sophia-Antipolis Cedex, France, vol. RAN WG2, No. Electronic, Nov. 2, 2020-Nov. 13, 2020 Oct. 22, 2020 (Oct. 22, 2020), XP051941964, 6 Pages, Retrieved from the Internet: URL: https://ftp.3gpp.org/tsg_ran/WG2_RL2/TSGR2_112-e/Docs/R2-2008886.zip R2-2008886 (R17NRPOS A8112).doc [Retrieved on Oct. 22, 2020] Section 2.
(Continued)

*Primary Examiner* — Noel R Beharry
*Assistant Examiner* — Lionel Preval
(74) *Attorney, Agent, or Firm* — Weaver Austin Villeneuve & Sampson LLP

(57) ABSTRACT

A method of measurement gap (MG) configuration of a first user equipment (UE) for sidelink positioning reference signal (SL-PRS) measurements comprises determining, at a network node, information regarding a first positioning reference signal (PRS) measurement to be made by the first UE. The first PRS measurement may comprise an SL-PRS measurement. The method also comprises determining, at the network node, information regarding a second PRS measurement. The method also comprises determining an MG configuration, where the MG configuration schedules at least one MG for at least one period of time during which during which the first UE is to make the first PRS measurement, and the MG configuration is based at least in part on the information regarding the first PRS measurement and the information regarding the second PRS measurement. The method also comprises sending the MG configuration to the first UE.

30 Claims, 12 Drawing Sheets

(51) Int. Cl.
H04L 5/00 (2006.01)
H04W 64/00 (2009.01)
H04W 92/18 (2009.01)

(56) References Cited

OTHER PUBLICATIONS

International Search Report and Written Opinion—PCT/US2021/072639—ISA/EPO—dated Mar. 29, 2022.
Qualcomm Incorporated: "Potential Enhancements for NR Rel-17 Positioning", 3GPP TSG RAN WG1 #102-e, 3GPP Draft, R1-2006810, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), pp. 1-21, XP051918260, Retrieved from the Internet: URL: https://ftp.3gpp.org/tsg_ran/WG1_RL1/TSGR1_102-e/Docs/R1-2006810.zip, R1-2006810.docx [retrieved on Aug. 8, 2020], Proposal 11, paragraph [03.3] paragraph [4.2.2], p. 11.

\* cited by examiner

MEASUREMENT GAP (MG) CONSIDERATION OF SIDELINK (SL)-ASSISTED POSITIONING

BACKGROUND

1. Field of Invention

The present invention relates generally to the field of wireless communications, and more specifically to determining the location of a User Equipment (UE) using radio frequency (RF) signals.

2. Description of Related Art

The use of a sidelink (SL) interface in the positioning of a UE for which a position is to be determined (or "target UE") may be similar in ways to the use of base stations. For example, measurement gaps (MGs) may be used to allow a UE to tune its transceiver appropriately to be able to measure reference signals for positioning. With this in mind, there are situations in which measurement gaps could be used more efficiently to allow for measurements related to SL-assisted positioning.

BRIEF SUMMARY

An example method of measurement gap (MG) configuration of a first user equipment (UE) for sidelink positioning reference signal (SL-PRS) measurements, according to this disclosure, comprises determining, at a network node, information regarding a first positioning reference signal (PRS) measurement to be made by the first UE, the first PRS measurement may comprise an SL-PRS measurement. The method also comprises determining, at the network node, information regarding a second PRS measurement. The method also comprises determining an MG configuration, where the MG configuration schedules at least one MG for at least one period of time during which during which the first UE is to make the first PRS measurement, and the MG configuration is based at least in part on the information regarding the first PRS measurement and the information regarding the second PRS measurement. The method also comprises sending the MG configuration to the first UE.

Another example method of measurement gap (MG) configuration of a first user equipment (UE) for sidelink positioning reference signal (SL-PRS) measurements, according to this disclosure, comprises sending, from the first UE to a network node: an MG configuration report indicative of an first MG configuration, or a motion report indicative of movement of the first UE, or both. The method also comprises subsequent to the sending, receiving a second MG configuration at the first UE, the second MG configuration scheduling an MG for a period of time during which an SL-PRS is to be measured. The method also comprises measuring the SL-PRS in accordance with the MG configuration.

An example device for providing measurement gap (MG) configuration of a first user equipment (UE) for sidelink positioning reference signal (SL-PRS) measurements, according to this disclosure, comprises a communications interface, a memory, and one or more processing units communicatively coupled with the communications interface and the memory. The one or more processing units are configured to determine information regarding a first positioning reference signal (PRS) measurement to be made by the first UE, the first PRS measurement may comprise an SL-PRS measurement. The one or more processing units are also configured to determine information regarding a second PRS measurement, and determine an MG configuration, where the MG configuration schedules at least one MG for at least one period of time during which during which the first UE is to make the first PRS measurement, and the MG configuration is based at least in part on the information regarding the first PRS measurement and the information regarding the second PRS measurement. The one or more processing units are also configured to send, with the communications interface, the MG configuration to the first UE.

According to this disclosure, a first user equipment (UE) configured to obtain measurement gap (MG) configuration for sidelink positioning reference signal (SL-PRS) measurements comprises a wireless communication interface, a memory, and one or more processing units communicatively coupled with the wireless communication interface and the memory. The one or more processing units are configured to send to a network node via the wireless communication interface: an MG configuration report indicative of an first MG configuration, or a motion report indicative of movement of the first UE, or both. The one or more processing units are also configured to, subsequent to the sending, receive a second MG configuration via the wireless communication interface, the second MG configuration scheduling an MG for a period of time during which an SL-PRS is to be measured. The one or more processing units are also configured to measure the SL-PRS in accordance with the MG configuration.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Figure 1:
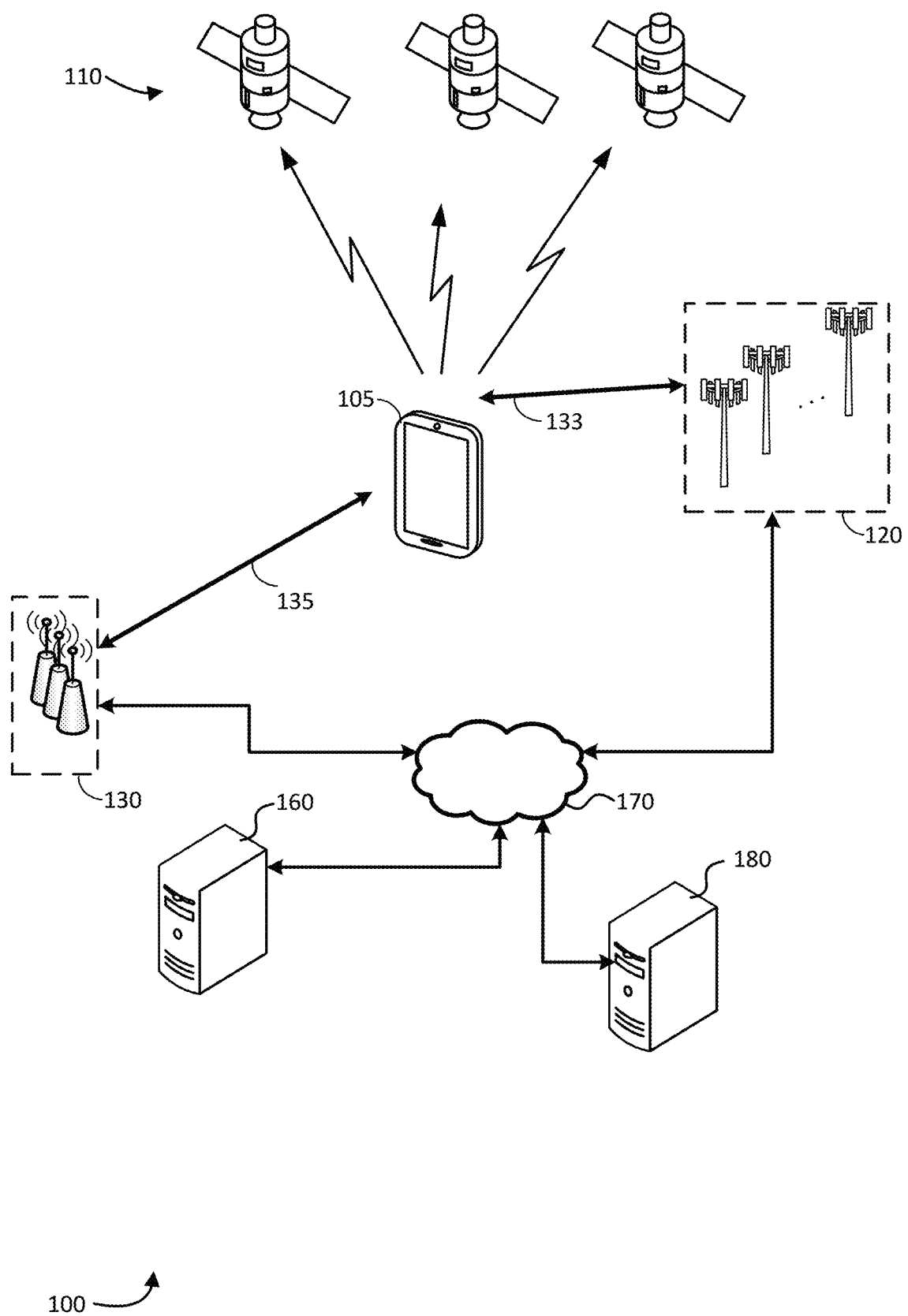
FIG. 1 is a diagram of a positioning system, according to an embodiment.

FIG. 1 is a simplified illustration of a positioning system 100 in which a UE 105, location server 160, and/or other components of the positioning system 100 can use the techniques provided herein for configuring measurement gaps (MGs) when making measurements to determine an estimated location of UE 105 using sidelink (SL)-assisted positioning, according to an embodiment. Again, when determining the position of a UE (e.g., UE 105) it may be referred to as a "target UE." The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120 and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted, and as discussed in more detail below, the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. Moreover, in some embodiments, a location of the UE 105 may be estimated at least in part based on measurements of RF signals communicated between the UE 105 and one or more other UEs (not shown in FIG. 1), which may be mobile. Direct communication between the one or more other UEs and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc.

Figure 2:
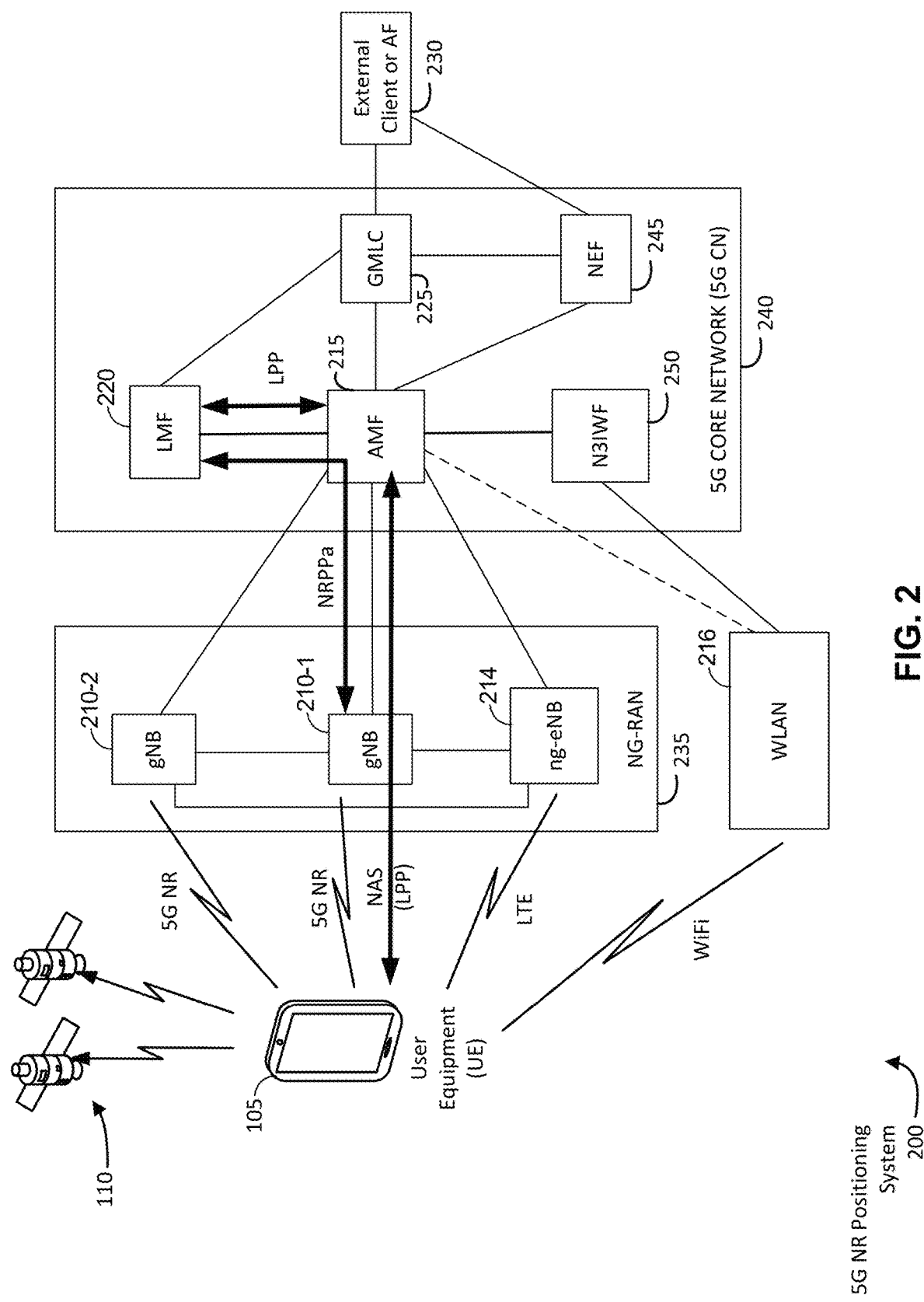
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). Access to the 5G network is provided to UE 105 via wireless communication between the UE 105 and one or more of the gNBs 210, which may provide wireless communications access to the 5G CN 240 on behalf of the UE 105 using 5G NR. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to SGCN 240 may occur if WLAN 216 is a trusted WLAN for SGCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more ANs. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to SGCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA) or DL-TDOA), Real Time Kinematic (RTK), Precise Point Positioning (PPP), Differential GNSS (DGNSS), Enhance Cell ID (ECID), angle of arrival (AOA), angle of departure (AOD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as SGCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in SGCN 240. The NEF 245 may support secure exposure of capabilities and events concerning SGCN 240 and UE 105 to the external client 230, which may then be referred to as an Access Function (AF) and may enable secure provision of information from external client 230 to SGCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol A (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, OTDOA, multi-cell RTT, AOD, and/or ECID. The NRPPa protocol may be used to support positioning of UE 105 using network based position methods such as ECID, AOA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AOA, Receive Time-Transmission Time Difference (Rx-Tx), Differential AOA (DAOA), AOD, or Timing Advance (TA) for gNBs 210, ng-eNB 214, and/or one or more access points for WLAN 216. Additionally or alternatively, similar measurements may be made of sidelink signals transmitted by other UEs, which may serve as "anchor points" for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AOA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for OTDOA, AOD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AOD and/or AOA.

Figure 3:
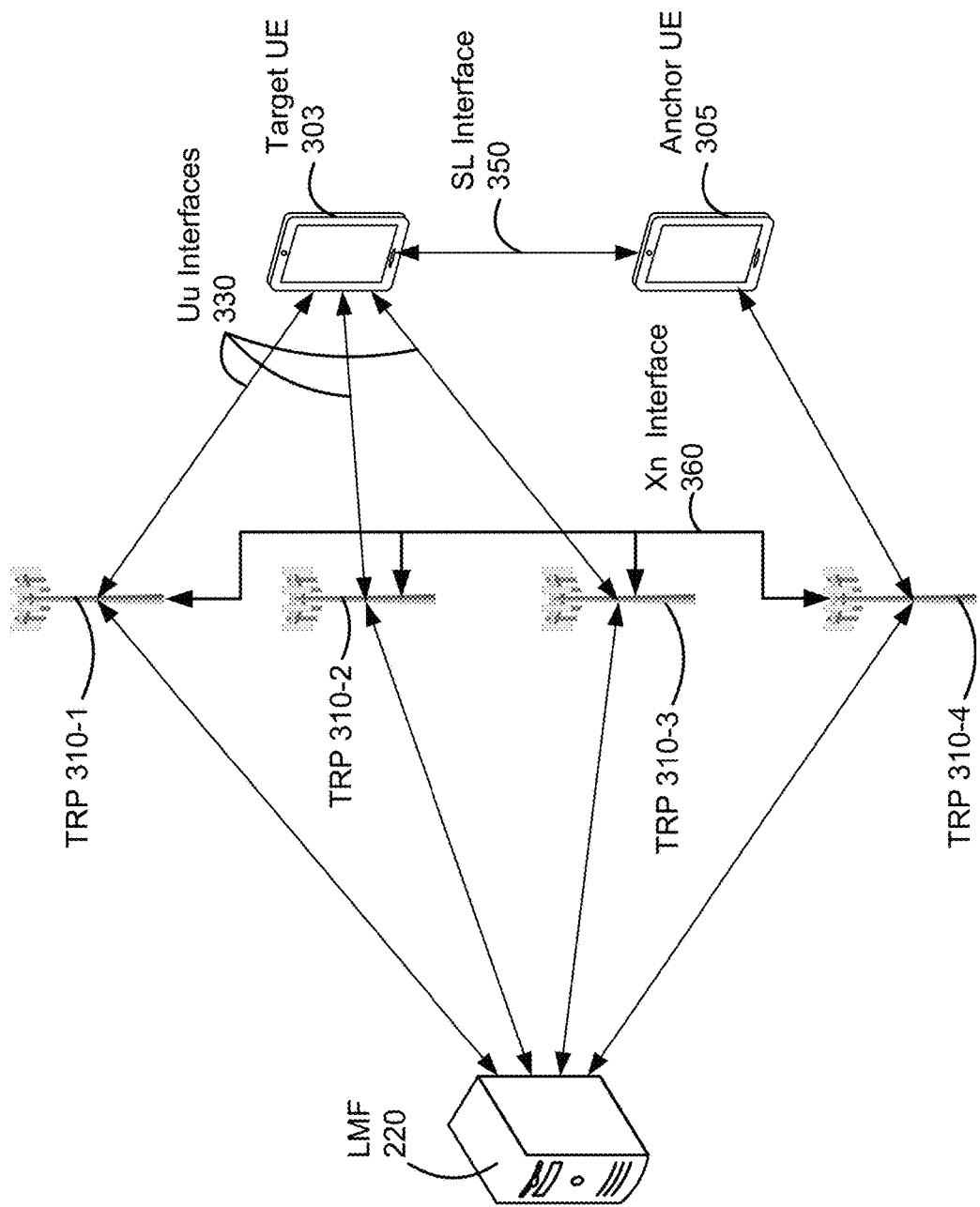
FIG. 3 is a simplified diagram illustrating how an anchor User Equipment (UE) can be used in the positioning of a UE in a 5G NR network, according to an embodiment.

FIG. 3 is a simplified diagram illustrating how an "anchor" UE 305 (a UE having a known location) can be used in the positioning of a target UE 303 in a 5G NR network, according to an embodiment. Positioning that uses an anchor UE 305 and an SL interface 350 as described herein may be referred to as "SL-assisted" positioning. In FIG. 3, arrows between the various components illustrate communication links. As illustrated in FIG. 2, communication may involve wireless and/or wired communication technologies and may include one or more intermediary components. TRPs 310-1, 310-2, 310-3, and 310-4 may be referred to collectively or generically as TRP(s) 310 and may correspond with, for example, base stations 120 of FIG. 1 and/or gNB 210 or ng-eNB 214 of FIG. 2. For simplicity, a single anchor UE 305 is illustrated. However, although only one anchor UE 305 may be used in some instances, other instances may use two or more. Moreover, in some instances, anchor UEs 305 may comprise the only type of anchor point for positioning and/or TRPs 310 may not be used as anchor points. (As used herein, the term "anchor point" refers to a device with a known location used to determine the location of the target UE 303.) Further, although anchor UE 305 and target UE 303 are illustrated as having separate serving TRPs (TRP 310-4 and TRP 310-1, respectively), embodiments are not so limited. In some scenarios, for example, target UE 303 and anchor UE 305 may share a common serving TRP 310.

To determine the position of the target UE 303 (e.g., using any of the previously-described positioning techniques) the target UE 303 can take measurements of wireless signals sent from different anchor points. For example, TRPs 310-1 to 310-3 and anchor UE 305. The target UE 303 can communicate with and/or obtain measurements from TRP 310-1 to TRP 310-3 using a Uu (network) interface 330. Measurements may be made from reference signals from the TRPs 310, such as PRS (e.g., DL-PRS).

With regard to anchor UE 305, target UE 303 can communicate using SL interface 350. As previously noted, and SL interface 350 allows direct (D2D) communication between the target UE 303 and anchor UE 305, and may be used in a manner similar to the Uu interfaces 330, allowing the target UE 303 to obtain position-related measurements in relation to determining the location of the target UE 303. In particular, and anchor UE 305 may operate in either a "transparent" mode or "advanced" mode. In the transparent mode, the anchor UE 305 essentially operates like a TRP, such that the SL interface 350 mimics a Uu interface 330 for purposes of positioning. This can allow for SL-assisted positioning of target UEs 303, for example, that may not be capable of operating in an advanced mode. In the advanced mode, communications using the SL interface 350 may be SL-specific (including SL-specific reference signals, protocols, etc.), which may allow for more flexibility for positioning of the target UE 303. In either mode, the anchor UE 305 may be configured to provide a PRS (e.g., SL-PRS) and/or similar reference signal via the SL interface 350, which may be transmitted in a manner similar to a TRP. As used herein, the term "SL-PRS" may apply to all positioning reference signals communicated between UEs 303, 305, which can include reference signals communicated via either advanced or transparent modes, including an SL interface 350 that mimics a Uu interface 330. (In the latter case, a UL-PRS transmitted by a target UE 303 to an anchor UE 305 would be considered an SL-PRS.) The SL-PRS may comprise, for example, an SRS-Pos signal or a dedicated reference signal for positioning in SL. For its part, the anchor UE 305 may also communicate with the LMF 220 via TRP 310-4 using a Uu interface 330. As noted, TRP 310-4 may comprise the serving TRP for anchor UE 305 in this example.

In 5G NR positioning, reference signals, such as DL-PRS sent via Uu interface(s) 330 and/or SL-PRS sent via SL interface 350, may be sent on a frequency spectrum, or bandwidth part (BWP), that is different than an in-use or "active" BWP used by a UE 105 for communications. Thus, a UE 105 may need to tune its transceiver to be able to measure reference signals on the different BWP. Additional information regarding BWPs and measuring PRS provided below with regard to FIGS. 4-5.

Figure 4:
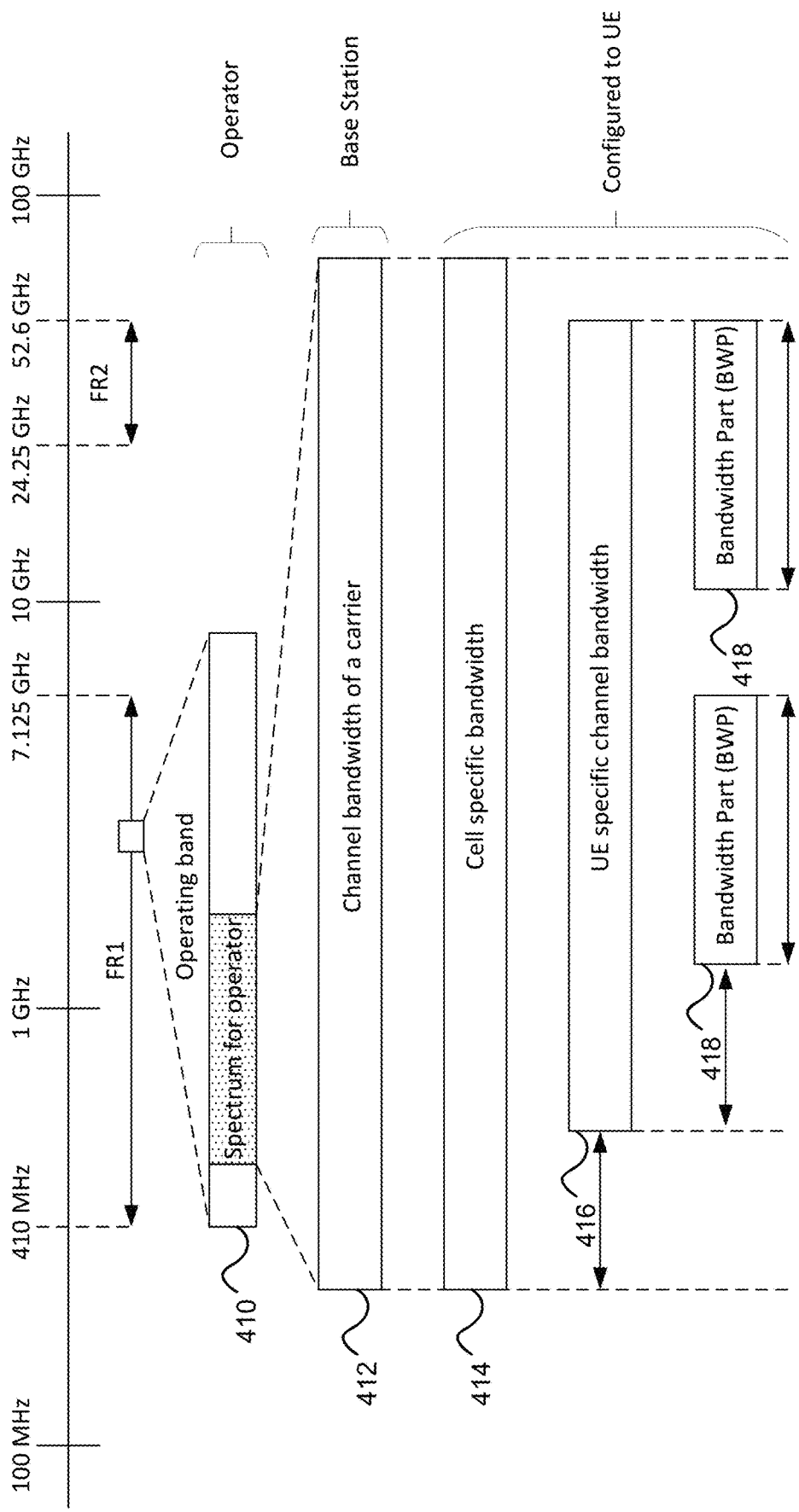
FIG. 4 is a diagram of a 5G NR spectrum provided to help illustrate the concept of bandwidth parts (BWPs).

FIG. 4 illustrates an illustration of a 5G NR spectrum and the concept of bandwidth parts (BWPs). At a high level, NR defines frequency ranges (FR). In various embodiments, there are two defined frequency ranges. FR1 is from 510 MHz to 7.125 GHz. FR2 is from 24.25 GHz to 52.6 GHz. 4GPP standards define operating bands 410 within each FR. An operating band 410 is a frequency band associated with a set of radio frequency (RF) requirements. Bandwidths of different operating bands 410 can vary from several MHz to a few GHz. Operators are assigned differ amounts of the frequency spectrum within an operating band 410. 5G NR techniques support a range of channel bandwidths from 5 to 500 MHz, where a channel bandwidth 412 refers to the bandwidth of the NR carrier. TRPs (e.g., base stations) and UEs 105 can support different channel bandwidths. The cell specific bandwidth 414 can match the channel bandwidth 412 of the carrier. In some cases, the UE bandwidth 416 can be more limited that the cell specific bandwidth 414. The UE can receive information about the channel bandwidth 412 of the cell and the position and width of a bandwidth part (BWP) 418 from, for example, a serving TRP.

A BWP 418 is a subset or part of a total carrier bandwidth 412. A BWP 418 forms a set of contiguous common resource blocks (CRBs) of the Orthogonal Frequency-Division Multiplexing (OFDM) scheme used in 5G NR, within the full carrier bandwidth 412. Currently, a UE can be configured with up to four downlink BWPs and up to four uplink BWPs for each serving cell. Due to UE battery consumption, only one BWP in the downlink and one in the uplink are active at a given time on an active serving cell. The active BWP defines the UE's operating bandwidth within the cell's operating bandwidth. The non-active BWPs are deactivated and do not transmit or receive data. For Time Division Duplex (TDD) operation, a BWP pair (an active UL BWP and active DL BWP) have the same center frequency. The network can dynamically switch the UE to a desired BWP when the desired BWP is not active.

LTE maximum carrier bandwidth is much smaller to that of NR (20 MHz vs 500 MHz). Therefore, an NR UE scanning full carrier bandwidth (e.g., 500 MHz) would consume a very large amount of power. Moreover, with NR supporting multiple UE types and capabilities, not all devices may be capable of receiving the full carrier bandwidth. The use of BWPs reduces UE power consumption for UEs capable of receiving maximum carrier bandwidth. For example, a UE can be configured to use a BWP with a wider bandwidth during large amounts of data transfer while keeping the UE on a BWP with a narrow bandwidth during low data activity periods.

As previously noted, reference signals for positioning one or more UEs may be sent BWPs other than an active BWP for a given UE. To allow the UE to receive these reference signals, a measurement gap (MG) may configured for the UE 105. A MG comprises a period of time in which the UE 105 can retune its transceiver from the active BWP to a BWP of the reference signals to make one or more measurements of the reference signals, after which the UE can re-tune its transceiver to an active BWP.

Figure 5:
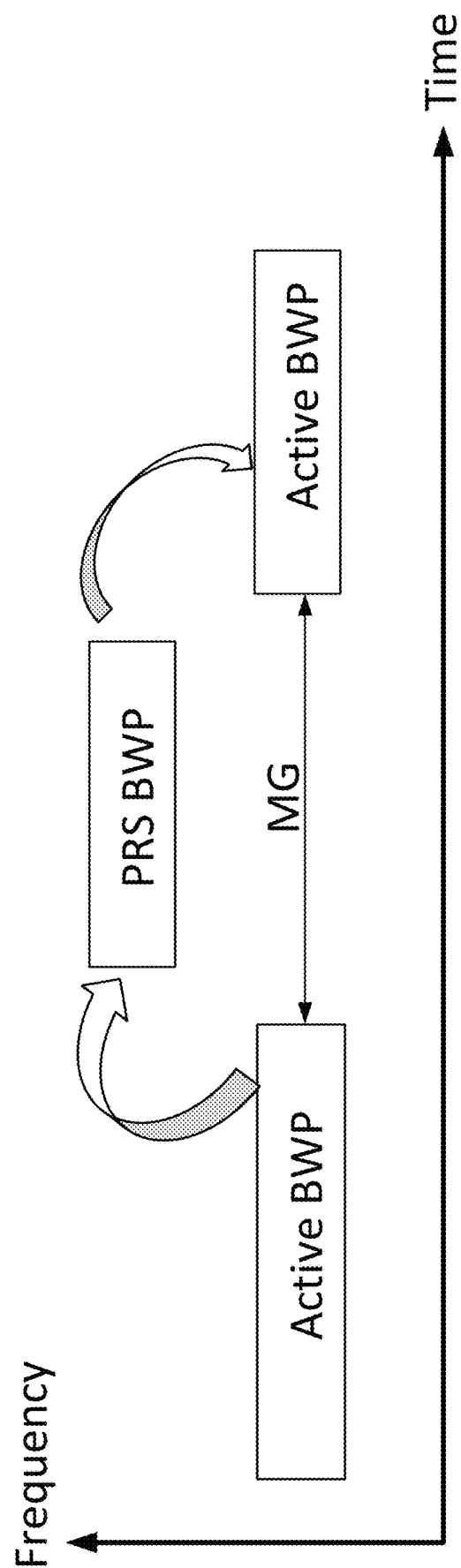
FIG. 5 is a diagram that provides a basic example of a measurement gap (MG) in terms of time and frequency, according to an embodiment.

FIG. 5 is a diagram that provides a basic example of an MG in terms of time and frequency. Here, a UE's transceiver communicates (e.g., receiving DL data and signaling from its serving TRP) via an active BWP. One or more PRS signals for positioning (e.g., DL-PRS from TRPs and/or SL-PRS from other UEs) occur on a separate PRS BWP. Thus, to obtain PRS measurements from these PRS signals sent on the PRS BWP, an MG can be configured for the UE. This allows the UE to re-tune its transceiver to the PRS BWP during the MG to observe the PRS signals. In some instances, to determine a position of the UE using PRS signals, a UE and a location server (e.g., LMF 220 of FIGS. 2 and 3) may initiate a location session in which the UE is given a period of time to observe PRS resources and report resulting PRS measurements to the location server.

Figure 6A:
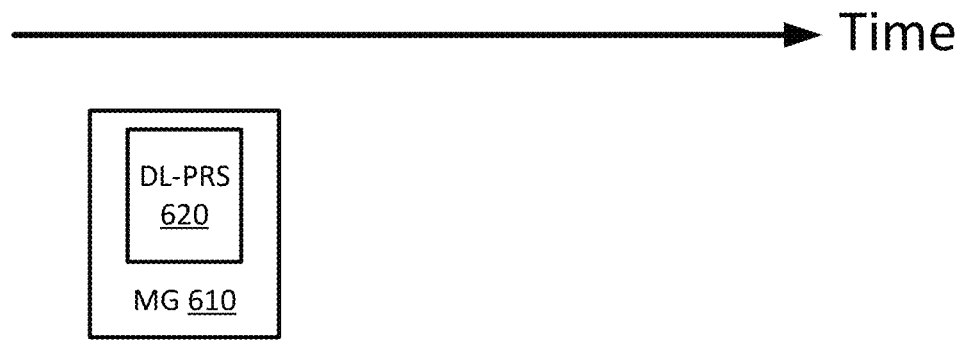
FIGS. 6A-6C are diagrams illustrating examples of the timing of reference signal measurements and related MGs, according to some embodiments.
Figure 6B:
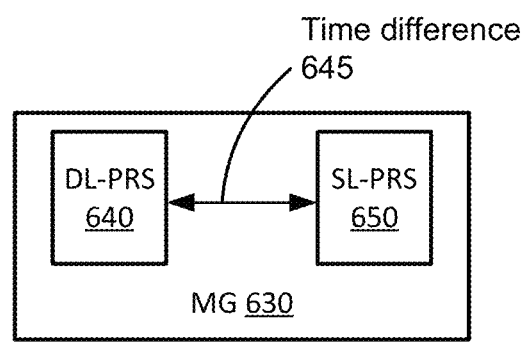
Figure 6C:
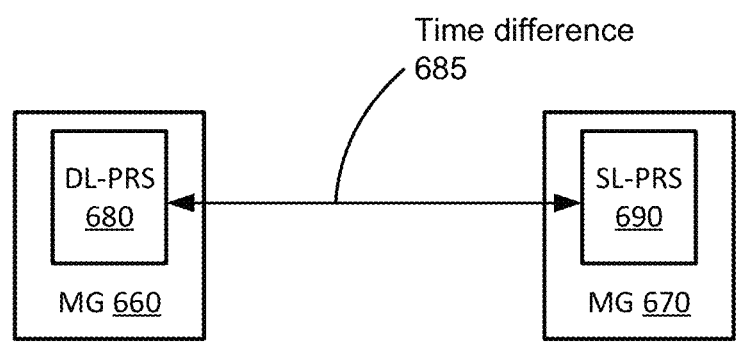

The UE can request an MG from a serving TRP, for example, which can then provide the UE with an MG configuration (e.g., via Radio Resource Control (RRC) protocol, Downlink Control Information (DCI), or Medium Access Control (MAC) Control Element (CE) (MAC-CE)), which schedules the MG (or MG pattern, if a series of measurements in the PRS BWP is to be performed by the UE). To allow the network to configure the UE in a manner that accommodates the processing and buffering capabilities of the UE (which may be dynamic), the UE may provide to the network (e.g., a TRP or location server) capabilities related to PRS processing. The MG configuration may schedule the MG or MG pattern using one or more parameters, which may comprise an MG offset (MGO), MG length (MGL), MG repetition period (MGRP), and/or other parameters describing the timing of the MG. FIGS. 6A-6C show different example MG configurations.

FIG. 6A is a diagram illustrating a basic approach for scheduling an MG 610 for a UE to measure a DL-PRS 620. Here, the MG may be scheduled in view of a time at which the DL-PRS 620 is to be transmitted by a nearby TRP via a Uu interface, giving enough time before and after the DL-PRS 620 to allow the UE to re-tune its transceiver from the active BWP to the PRS BWP before the DL-PRS 620, then back again afterward. Otherwise, and MG can be scheduled for a DL-PRS and can be independent of the active BWP.

According to embodiments herein, MG for SL-PRS transmitted by neighboring UEs may be scheduled in a similar manner. (Depending on the types of positioning techniques used, a target UE 303 and/or anchor UE 305 may transmit and/or measure SL-PRS via an SL interface 350. For RTT-based positioning, for example, each UE may do both.) Moreover, according to embodiments, the scheduling of an MG for an SL-PRS measurement may be made in view of other PRS (of DL-PRS and/or other SL-PRS) and may consider other factors.

FIGS. 6B and 6C are diagrams of how, according to embodiments, an MG may be scheduled for an SL-PRS in view of another PRS (DL-PRS 640, 680). In FIG. 6B, for example, a common MG 630 is used for both DL-PRS 640 and SL-PRS 650. This can be used in circumstances in which it may be desirable to keep a time difference 645 under a threshold amount of time. Alternatively, as shown in FIG. 6C, separate MGs 660, 670 may be scheduled for DL-PRS 680 and SL-PRS 690, respectively, if a larger time difference 685 is tolerable. An amount of allowable time difference 645, 685 between PRS measurements may be dependent on accuracy requirements for the positioning and/or movement of either or both UEs in an SL-PRS measurement.

Referring again to FIG. 3, if an anchor UE 305 is moving, it may impact the accuracy of a position estimate for the target UE 303 by producing "noise" in the anchor UE's location. This noise can introduce estimation errors in the positioning of the target UE 303. Additionally or alternatively, if a position of the anchor UE 305 is unknown, "joint positioning" can be performed to determine position estimates for both the anchor UE 305 and target UE 303. In either these situations, it may be desirable to minimize a time difference 645, 685 to help ensure accurate positioning of the target UE 303. Again, the threshold amount of time difference tolerable in any circumstance may depend on a desired accuracy of the position estimate for the target UE 303. (E.g., a higher accuracy requirement and/or faster movement of the anchor UE 305 may result in a smaller threshold time difference.)

According to embodiments, an MG configuration may schedule a single MG 630 for measuring an SL-PRS 650 and one or more additional PRS measurements (e.g., DL-PRS 640) in cases where a smaller time difference 645 may be needed. Alternatively, an MG configuration may schedule to MGs 660, 670 for measuring the SL-PRS 690 and one or more additional PRS measurements (e.g., DL-PRS 680) if a larger time difference 685 is allowable. In this latter case, separate MGs 660, 670 may be configured if a single MG would exceed a threshold maximum length for an MG and/or where there is sufficient time for the UE to re-tune its transceiver back to an active BWP between MGs 660, 670.

To determine an MG configuration for SL-assisted positioning, a location server, serving TRP, or other UE determining the MG configuration may obtain movement information regarding the UE. This movement information may be obtained by one or more sensors of the UE, enabling the location server or serving TRP to determine whether to schedule one or two MGs, for example, in an MG configuration. As noted, this can further be based on accuracy requirements for the position estimate of the target UE.

Movement information regarding the UE can be provided in a motion report sent from the UE to the location server, serving TRP, or other UE. The motion report can be sent in response to a request sent to the UE by the location server, serving TRP, or other UE. Additionally or alternatively, the UE may send a motion report periodically/semi-persistently, based on a schedule. According to some embodiments, the UE may additionally or alternatively send a motion report based on a triggering event, such as a change in the UEs motion status.

The content of the motion report may vary, depending on desired functionality. The type of information included in a motion report from a UE may include, but is not limited to, a speed, acceleration, heading direction, orientation, rotation speed, and/or motion status of the UE. Further, the motion report may include an uncertainty value with regard to any of this other information. A motion status may comprise a higher-level assessment of the UEs motion, such as static, dynamic, rotation, or the like.

According to some embodiments, an MG configuration for SL-assisted positioning in the manner described above in which a single MG 630 or different MGs 660, 670 are scheduled may further comprise modifying an existing MG configuration. That is, for example, an MG configuration may exist in which an MG 610 is scheduled for a DL-PRS 620, and a location server, serving TRP, or other UE can modify the existing MG configuration to allow for measurement of an SL-PRS 650 or 690. This modification can include extending/rescheduling a single MG to cover both the DL-PRS 640 and SL-PRS 650 (e.g., as illustrated in FIG. 6B) and/or scheduling a new MG such that the DL-PRS 680 and SL-PRS 690 have separate MGs 660, 670.

Because MG configuration is typically determined by a serving TRP, embodiments can allow for a UE to provide an MG configuration report in which the UE sends a location server or other UE the UE's MG configuration (e.g., to perform a DL-PRS measurement), and the location server/other UE can modify the MG configuration to further allow for SL-PRS measurements. This functionality can be particularly useful, for example, when scheduling SL-PRS measurements among UEs for SL-RTT measurements. Additional details are provided with regard to FIGS. 7A and 7B.

Figure 7A:
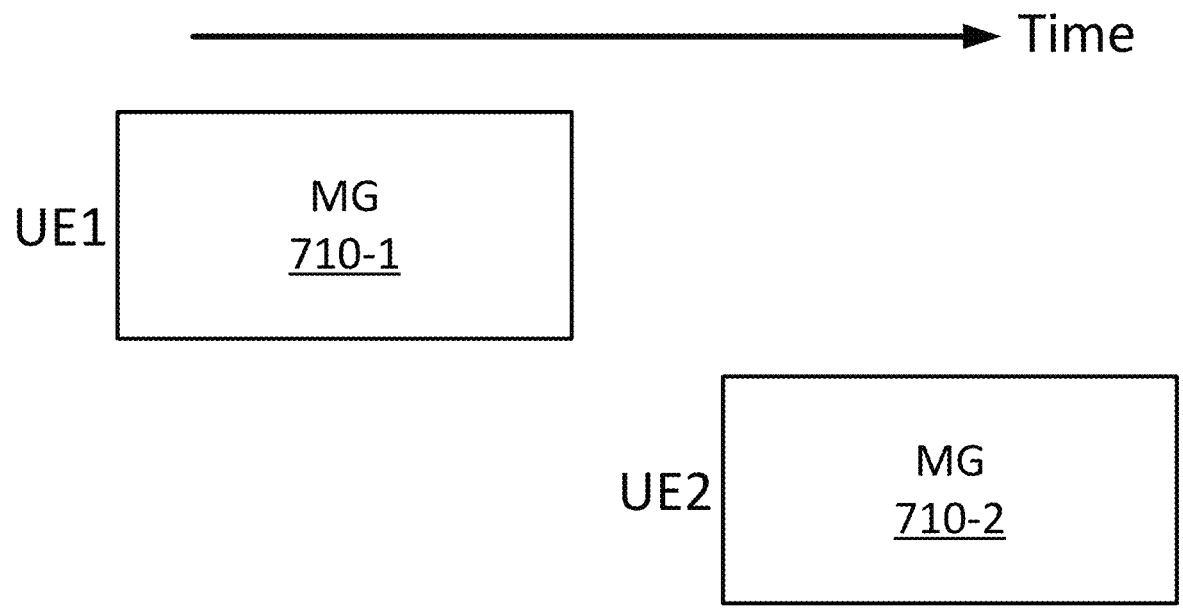
FIGS. 7A and 7B are timing diagrams illustrating how MGs may be altered in some situations to ensure overlap, according to some embodiments.

FIG. 7A as a timing diagram illustrating two MGs corresponding to UEs, where a first MG 710-1 for UE1 is scheduled during a first period of time, and a second MG 710-2 for UE2 is scheduled for a second period of time. MG configurations may be made for each UE individually, however, an LMF may be able to coordinate the timing of MGs 710 among UE1 and UE2, and/or the UEs may be able to do it themselves.

Figure 7B:
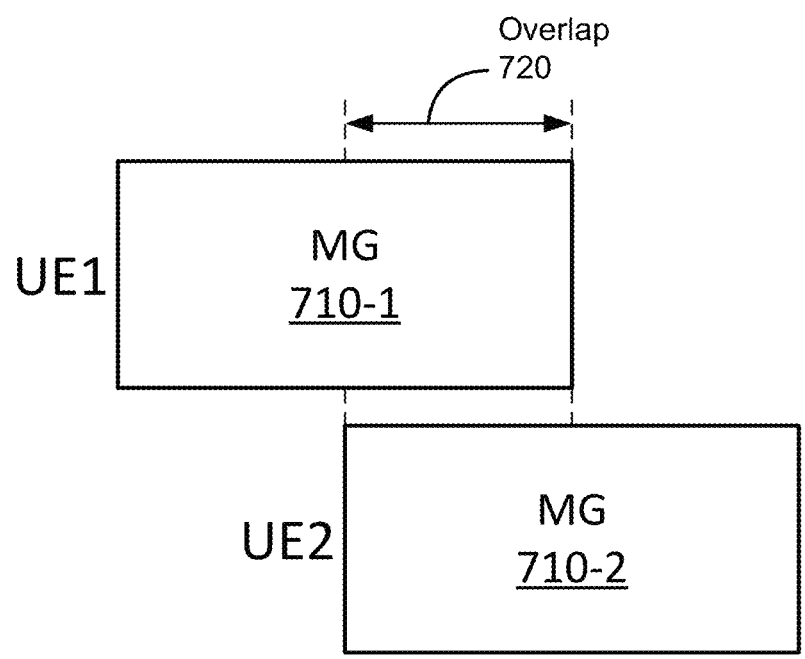

For some types of positioning, MG configurations such as the one illustrated in FIG. 7A, where there is no overlap between MGs 710, may be acceptable. For example, each UE may make DL-PRS and/or SL-PRS measurements during the MGs in accordance with the embodiments described above. However, for some types of positioning, including SL-RTT-based positioning, there may need to be an overlap due to the exchange of SL-PRS. Thus, according to some embodiments, a location server may modify an MG configuration of either or both UE1 and UE2 such that there is sufficient overlap 720, as illustrated in FIG. 7B, to perform the necessary SL-PRS measurements.

As noted, according to embodiments herein, a UE or its serving TRP may provide a location server with its MG configuration for SL-PRS measurements. The location server can then coordinate or schedule SL-PRS measurements among the UEs and determine whether the MG configuration should be modified based on the MG configuration of the UEs. In addition to determining sufficient overlap for MGs, the MG configuration can be further based on the timing for DL-PRS, movement of the UEs, and other factors described previously herein. If the location server determines a modification of the MG configuration for at least one of the UEs is desired to enable the UEs to perform SL-PRS and/or DL-PRS measurements efficiently and effectively, the location server can then provide a suggested modified MG configuration(s) to one or more serving TRP is for the UE(s). If the serving TRP(s) determine this the modified MG configuration may be performed, it may then send the modified MG configuration(s) to the UE(s).

Alternatively, according to some embodiments, a location server may not be used to schedule SL-PRS measurements among UEs. In such instances, SL-PRS transmissions and measurements may be coordinated among the UEs themselves by sharing MG configuration reports with each other and applying the principles for modifying SL-PRS MG configurations described above.

Figure 8:
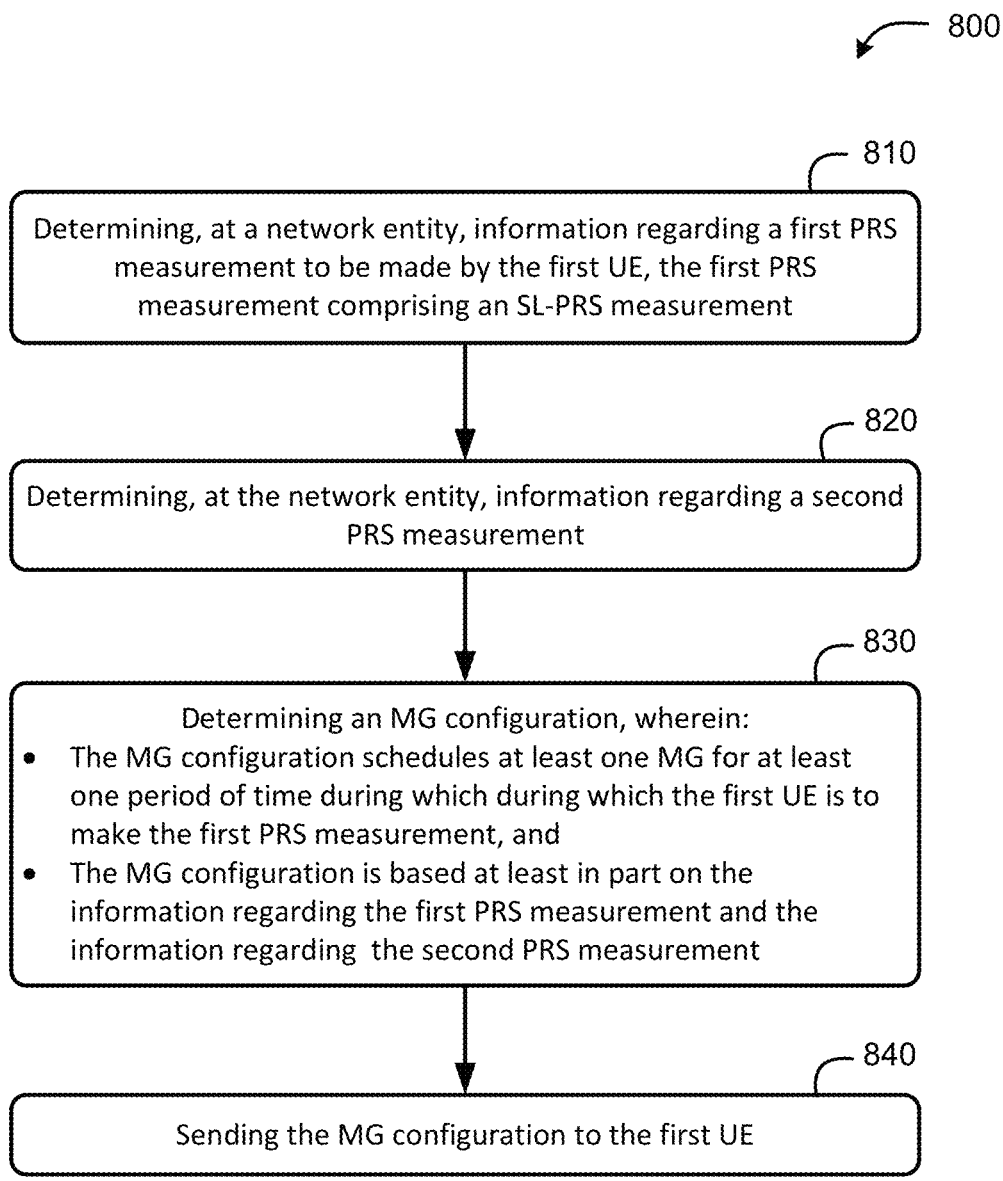
FIGS. 8 and 9 are flow diagrams of methods MG configuration of a first UE for Sidelink Positioning Reference Signal (SL-PRS) MG configurations, according to some embodiments.

FIG. 8 is a flow diagram of a method 800 of MG configuration of a first UE for SL-PRS measurements, according to an embodiment. Means for performing the functionality illustrated in one or more of the blocks shown in FIG. 8 may be performed by hardware and/or software components of a UE, or location server (e.g., location server 160 of FIG. 1 or LMF 220 of FIG. 2), or TRP (e.g., a serving TRP 310 or gNB 210 of the first UE). Example components of a UE are illustrated in FIG. 10, example components of a TRP are illustrated in FIG. 11, and example components of a computer server are illustrated in FIG. 12, all of which are described in more detail below.

At block 810, the functionality of method 800 comprises determining, at a network node, information regarding a first PRS measurement to be made by the first UE, the first PRS measurement comprising an SL-PRS measurement. This determination may comprise, for example, that an SL-PRS measurement for SL-assisted positioning may need to be scheduled and may occur in a BWP different than the active BWP of the first UE, so that an MG may be needed. The network node may comprise, for example, a serving TRP of the first UE, a location server, or a second UE.

Figure 10:
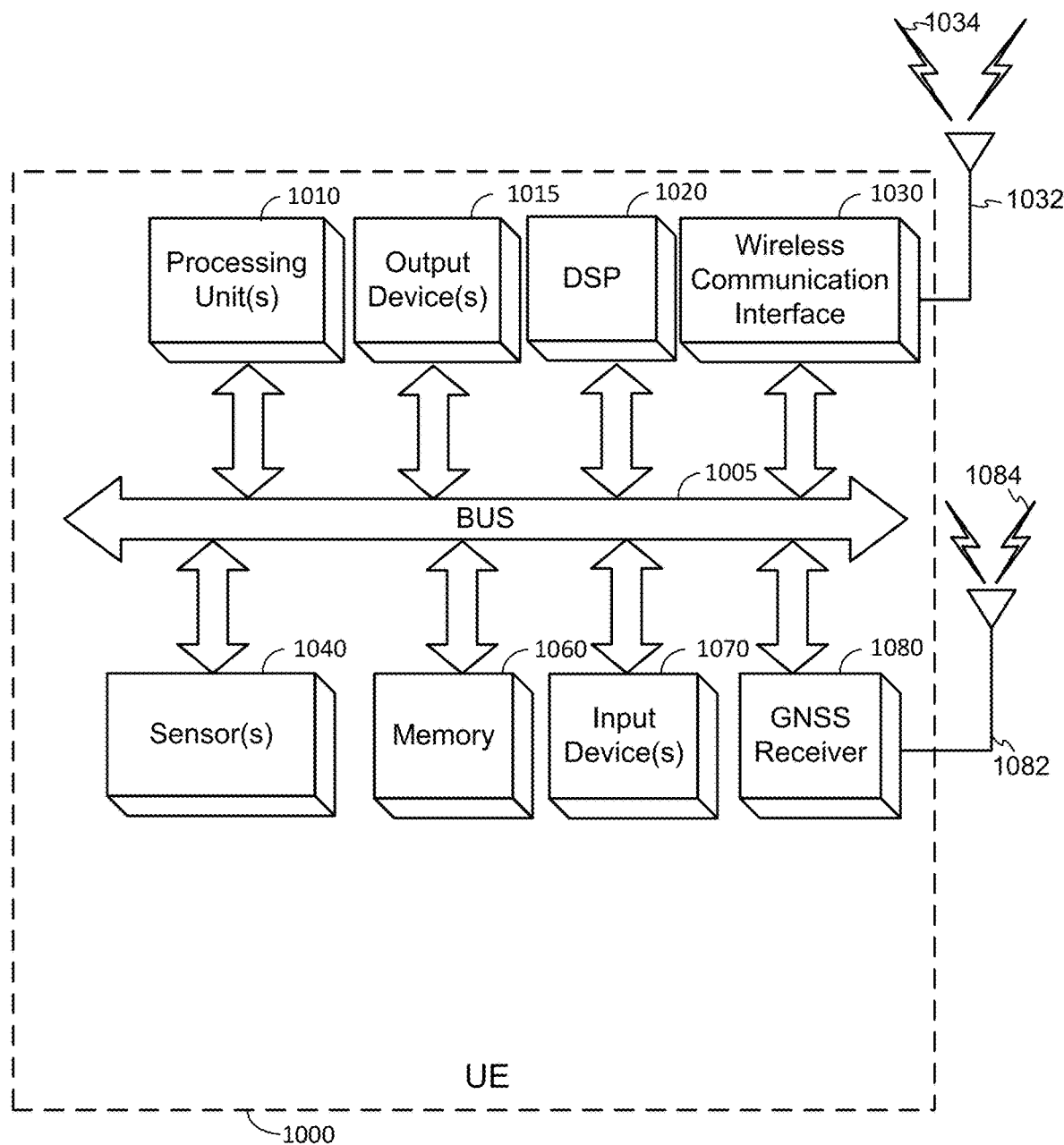
FIG. 10 is a block diagram of an embodiment of a UE, which can be utilized in embodiments as described herein.
Figure 11:
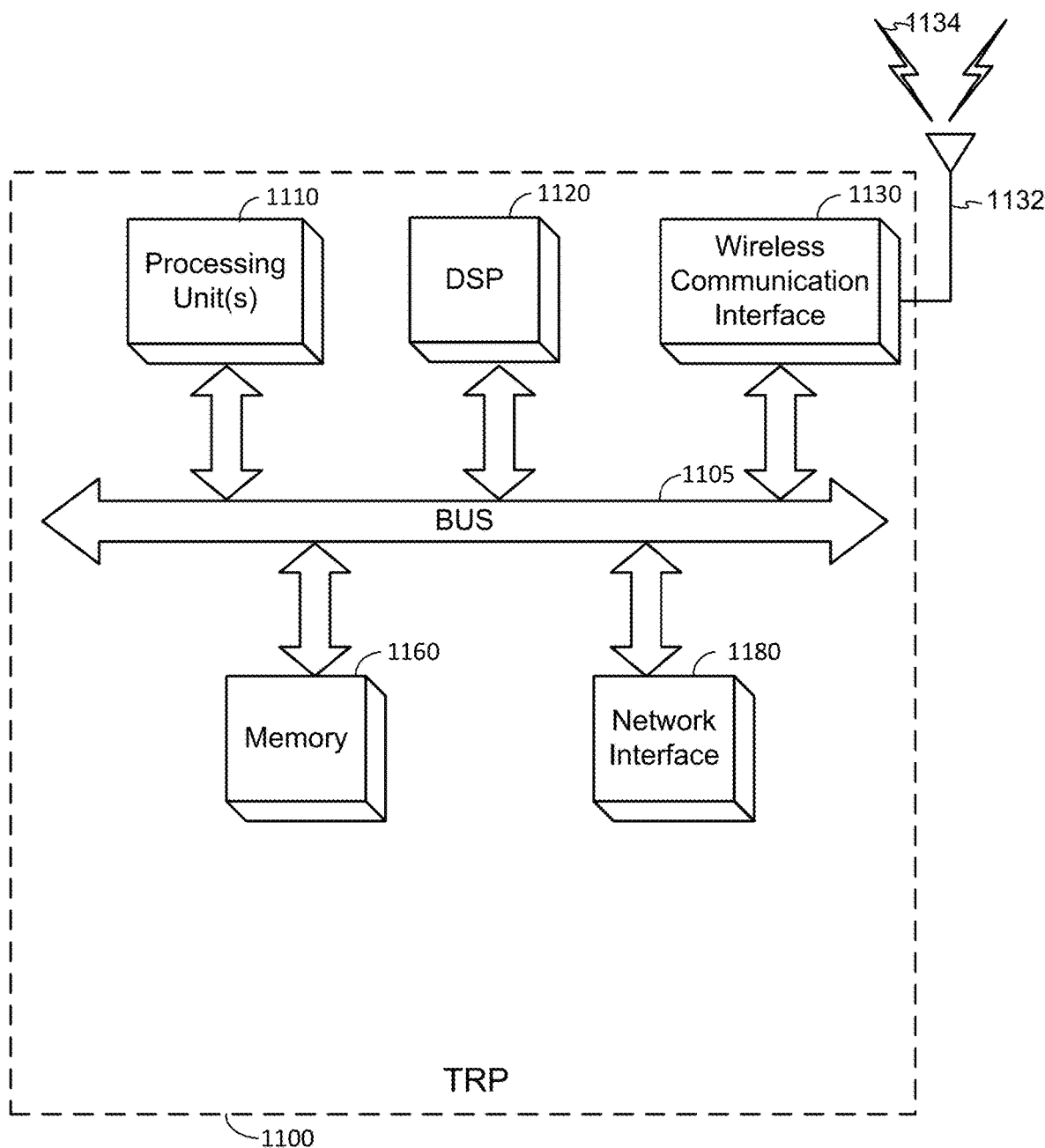
FIG. 11 is a block diagram of an embodiment of a base station, which can be utilized in embodiments as described herein.
Figure 12:
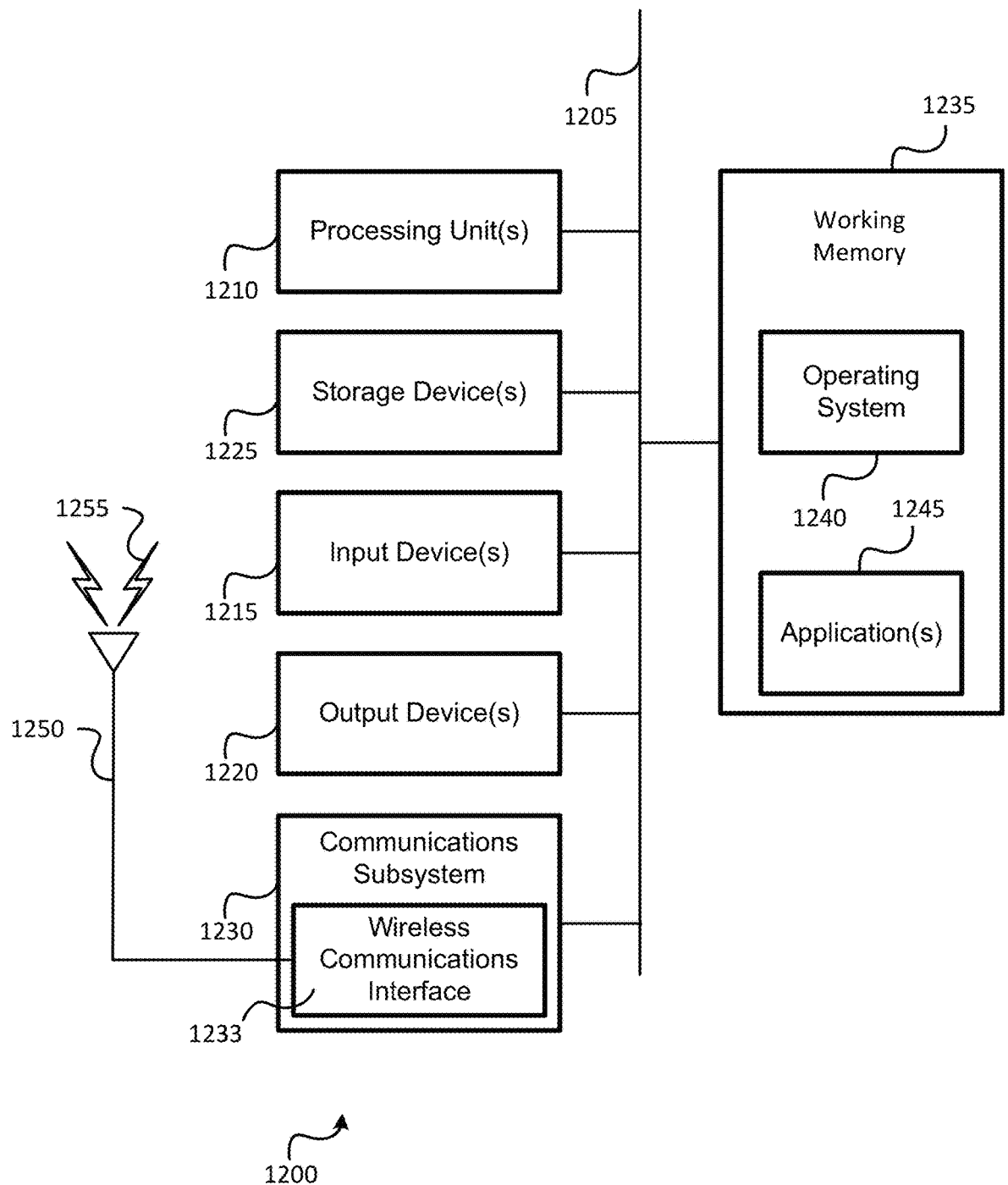
FIG. 12 is a block diagram of an embodiment of a computer system, which can be utilized in embodiments as described herein.

Means for performing the functionality at block 810 may comprise, for example, a bus 1005, processing unit(s) 1010, digital signal processor (DSP) 1020, wireless communication interface 1030, memory 1060, and/or other components of a UE as illustrated in FIG. 10; a bus 1105, processing unit(s) 1110, memory 1160, wireless communication interface 1130, and/or other components of a TRP as illustrated in FIG. 11; or a bus 1205, processing unit(s) 1210, working memory 1235, communications subsystem 1230, and/or other components of a computer system as illustrated in FIG. 12.

At block 820, the functionality comprises determining, at the network node, information regarding a second PRS measurement. As noted in the embodiments above, the determination of an MG configuration for SL-assisted positioning may be based on the timing of another PRS, such as a DL-PRS and/or SL-PRS. Thus, the second PRS measurement may comprise a DL-PRS measurement to be made by the first UE or a second SL-PRS measurements to be made by a second UE.

Means for performing the functionality at block 820 may comprise, for example, a bus 1005, processing unit(s) 1010, digital signal processor (DSP) 1020, wireless communication interface 1030, memory 1060, and/or other components of a UE as illustrated in FIG. 10; a bus 1105, processing unit(s) 1110, memory 1160, wireless communication interface 1130, and/or other components of a TRP as illustrated in FIG. 11; or a bus 1205, processing unit(s) 1210, working memory 1235, communications subsystem 1230, and/or other components of a computer system as illustrated in FIG. 12.

At block 830, the functionality comprises determining an MG configuration, wherein (i) the MG configuration schedules at least one MG for at least one period of time during which during which the first UE is to make the first PRS measurement, and (ii) the MG configuration is based at least in part on the information regarding the first PRS measurement and the information regarding the second PRS measurement. As described above with regard to FIGS. 6A-7B, MG configuration may consider DL-PRS to be measured by the first UE (e.g., in a single MG or separate MGs), and/or SL-PRS to be measured by the second UE (e.g., in overlapping MGs). Thus, according to some embodiments in which the second PRS measurement comprises a DL-PRS measurements be made by the first UE, the at least one MG comprises a single MG for the first PRS measurement and the second PRS measurement, or a first MG for the first PRS measurement and a second MG for the second PRS measurement. For embodiments in which the second PRS measurement comprises a second SL-PRS measurements be made by a second UE, the MG configuration may schedule a first MG for first time period during which the first UE is to make the first PRS measurement, such that the first MG overlaps at least partially with a second MG during which the second UE is to make the second PRS measurement.

Means for performing the functionality at block 830 may comprise, for example, a bus 1005, processing unit(s) 1010, digital signal processor (DSP) 1020, memory 1060, and/or other components of a UE as illustrated in FIG. 10; a bus 1105, processing unit(s) 1110, memory 1160, and/or other components of a TRP as illustrated in FIG. 11; or a bus 1205, processing unit(s) 1210, working memory 1235, and/or other components of a computer system as illustrated in FIG. 12.

At block 840, the functionality comprises sending the MG configuration to the first UE. The way in which the MG configuration is sent may vary depending on which devices performing this functionality. For example, a serving TRP or second UE may send the MG configuration directly to the first UE via a Uu or SL interface, respectively. Alternatively, if the network node comprises a location server, the sending the MG configuration to the first UE may comprise sending the MG configuration via the serving TRP of the first UE. In this latter case, as previously noted, the location server can send a suggested MG configuration (e.g., via NRPPa) and, if approved by the serving TRP, the serving TRP can then relay this configuration to the first UE using, for example, DCI, RRC, or MAC-CE.

Means for performing the functionality at block 840 may comprise, for example, a bus 1005, processing unit(s) 1010, digital signal processor (DSP) 1020, wireless communication interface 1030, memory 1060, and/or other components of a UE as illustrated in FIG. 10; a bus 1105, processing unit(s) 1110, memory 1160, wireless communication interface 1130, and/or other components of a TRP as illustrated in FIG. 11; or a bus 1205, processing unit(s) 1210, working memory 1235, communications subsystem 1230, and/or other components of a computer system as illustrated in FIG. 12.

As previously noted, determining an MG configuration may also take into consideration reports provided by the first UE. Accordingly, alternative embodiments of the method 800 may include such functionality. For example, according to some embodiments, the MG configuration may be additionally based on a motion report received from the first UE, and wherein the motion report is indicative of movement of the first UE. In such instances, the motion report may comprise a speed of the first UE, an acceleration of the first UE, a heading direction of the first UE, an orientation of the first UE, a rotation speed of the first UE, a motion status of the first UE, or uncertainty value regarding a measurement of movement of the first UE, or any combination thereof. Additionally or alternatively, the MG configuration may be additionally based on an MG configuration report received from the first UE, and the MG configuration report may be indicative of an initial MG configuration of the first UE different than the MG configuration sent to the first UE.

Although the method 800 uses information regarding a second PRS measurement when determining an MG configuration, embodiments are not so limited. For example, alternative embodiments may omit the functionality of block 820 and further modify the functionality of block 830 so that the MG configuration is based on the information regarding the first PRS (the SL-PRS) measurement, without necessarily considering other PRS measurements. These embodiments may further take into consideration the motion report and/or other previously-described factors when determining the MG configuration for the first PRS.

Figure 9:
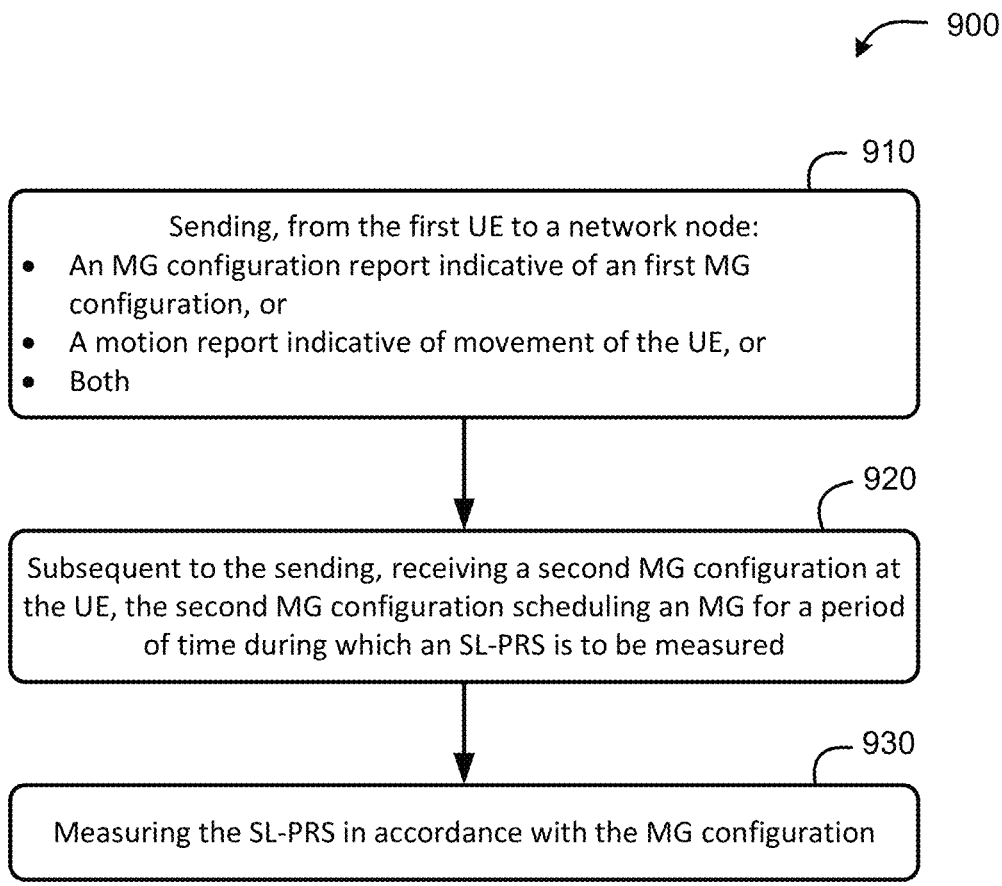

FIG. 9 is a flow diagram of a method 900 of MG configuration of a first UE for SL-PRS measurements, according to another embodiment. This method 900 may be performed, for example, by the first UE of the method of FIG. 8. As such, means for performing the functionality illustrated in one or more of the blocks shown in FIG. 9 may be performed by hardware and/or software components of a UE. As noted previously, example components of a UE are illustrated in FIG. 10, which is described in more detail below.

The functionality at block 910 comprises sending, from the first UE to a network node, (i) an MG configuration report indicative of an first MG configuration, or (ii) a motion report indicative of movement of the UE, or (iii) both. As noted previously, embodiments may modify an existing MG configuration for a DL-PRS, for example, to include an SL-PRS measurement (e.g., either in the same MG or a separate MG). Depending on the situation, this modification may be performed by any of a variety of devices. For example, according to some embodiments, the network node comprises a location server, a serving TRP of the first UE, or a second UE.

Additionally or alternatively, the network node may generate an MG configuration in view of a motion report of the first UE, which is indicative of movement of the first UE. As previously noted, the motion report may comprise a speed of the first UE, an acceleration of the first UE, a heading direction of the first UE, an orientation of the first UE, a rotation speed of the first UE, a motion status of the first UE, or uncertainty value regarding a measurement of movement of the first UE, or any combination thereof.

Means for performing the functionality at block 910 may comprise, for example, a bus 1005, processing unit(s) 1010, digital signal processor (DSP) 1020, wireless communication interface 1030, memory 1060, and/or other components of a UE as illustrated in FIG. 10.

The functionality at block 920 comprises subsequent to the sending (at block 910), receiving a second MG configuration at the UE, the second MG configuration scheduling an MG for a period of time during which an SL-PRS is to be measured. As previously noted, this MG configuration may be an MG configuration generated in view of a motion report of the first UE. However, if the second MG configuration is based on a first MG configuration, the second MG configuration may be a modification of the first MG configuration, modifying the timing one or more MGs of the first MG configuration. As such, according to embodiments in which, at block 910, MG configuration report was sent, the method 900 may further comprise receiving the first MG configuration prior to the sending, wherein the first MG configuration schedules the MG for a period of time different than the period of time scheduled by the second MG configuration. Further, as previously noted, MG configurations may be received by a serving TRP (which may relay the MG configurations from a location server). Thus, according to some embodiments of the method 900, the first MG configuration, the second MG configuration, or both, are received from a serving TRP of the UE.

Means for performing the functionality at block 920 may comprise, for example, a bus 1005, processing unit(s) 1010, digital signal processor (DSP) 1020, wireless communication interface 1030, memory 1060, and/or other components of a UE as illustrated in FIG. 10.

The functionality at block 930 comprises performing the SL-PRS measurement in accordance with the MG configuration. More specifically, this can entail the first UE, during the MG, tuning a transceiver (e.g., which may be part of wireless communication interface 1030 of the UE illustrated in FIG. 10) from an active BWP to a BWP of the SL-PRS, measuring the SL-PRS, and retuning the transceiver to the active BWP.

Means for performing the functionality at block 930 may comprise, for example, a bus 1005, processing unit(s) 1010, digital signal processor (DSP) 1020, wireless communication interface 1030, memory 1060, and/or other components of a UE as illustrated in FIG. 10.

FIG. 10 illustrates an embodiment of a UE 1000, which can be utilized as described herein above (e.g., in association with FIGS. 1-9) and may correspond with UE 105, target UE 303, and/or anchor UE 305. For example, the UE 1000 can perform one or more of the functions of the method shown in FIGS. 8 and 9. It should be noted that FIG. 10 is meant only to provide a generalized illustration of various components, any or all of which may be utilized as appropriate. Furthermore, as previously noted, the functionality of the UE discussed in the previously described embodiments may be executed by one or more of the hardware and/or software components illustrated in FIG. 10.

The UE 1000 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as DSP chips, graphics acceleration processors, application specific integrated circuits (ASICs), and/or the like), and/or other processing structures or means. As shown in FIG. 10, some embodiments may have a separate DSP 1020, depending on desired functionality. Location determination and/or other determinations based on wireless communication may be provided in the processing unit(s) 1010 and/or wireless communication interface 1030 (discussed below). The UE 1000 also can include one or more input devices 1070, which can include without limitation one or more keyboards, touch screens, touch pads, microphones, buttons, dials, switches, and/or the like; and one or more output devices 1015, which can include without limitation one or more displays (e.g., touch screens), light emitting diodes (LEDs), speakers, and/or the like.

The UE 1000 may also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1000 to communicate with other devices as described in the embodiments above. The wireless communication interface 1030 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1032 that send and/or receive wireless signals 1034. According to some embodiments, the wireless communication antenna(s) 1032 may comprise a plurality of discrete antennas, antenna arrays, or any combination thereof. The antenna(s) 1032 may be capable of transmitting and receiving wireless signals using beams (e.g., Tx beams and Rx beams). Beam formation may be performed using digital and/or analog beam formation techniques, with respective digital and/or analog circuitry. The wireless communication interface 1030 may include such circuitry.

Depending on desired functionality, the wireless communication interface 1030 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 1000 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1000 can further include sensor(s) 1040. Sensors 1040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 1000 may also include a Global Navigation Satellite System (GNSS) receiver 1080 capable of receiving signals 1084 from one or more GNSS satellites using an antenna 1082 (which could be the same as antenna 1032). Positioning based on GNSS signal measurement can be utilized to complement and/or incorporate the techniques described herein. The GNSS receiver 1080 can extract a position of the UE 1000, using conventional techniques, from GNSS satellites 110 of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1080 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1080 is illustrated in FIG. 10 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1010, DSP 1020, and/or a processing unit within the wireless communication interface 1030 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1010 or DSP 1020.

The UE 1000 may further include and/or be in communication with a memory 1060. The memory 1060 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the UE 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the UE 1000 (and/or processing unit(s) 1010 or DSP 1020 within UE 1000). In an aspect, then such code and/or instructions can be used to configure and/or adapt a general-purpose computer (or other device) to perform one or more operations in accordance with the described methods.

FIG. 11 illustrates an embodiment of a TRP 1100, which can be utilized as described herein above (e.g., in association with FIGS. 1-10) and may correspond with base station 120, gNB 210, a ng-eNB 214, and/or TRP 310. The TRP 1100 may be configured to perform one or more of the operations illustrated in the method 800 of FIG. 8 It should be noted that FIG. 11 is meant only to provide a generalized illustration of various components, any or all of which may be utilized as appropriate.

The TRP 1100 is shown comprising hardware elements that can be electrically coupled via a bus 1105 (or may otherwise be in communication, as appropriate). The hardware elements may include a processing unit(s) 1110 which can include without limitation one or more general-purpose processors, one or more special-purpose processors (such as DSP chips, graphics acceleration processors, ASICs, and/or the like), and/or other processing structure or means. As shown in FIG. 11, some embodiments may have a separate DSP 1120, depending on desired functionality. Location determination and/or other determinations based on wireless communication may be provided in the processing unit(s) 1110 and/or wireless communication interface 1130 (discussed below), according to some embodiments. The TRP 1100 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The TRP 1100 might also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the TRP 1100 to communicate as described herein. The wireless communication interface 1130 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1132 that send and/or receive wireless signals 1134.

The TRP 1100 may also include a network interface 1180, which can include support of wireline communication technologies. The network interface 1180 may include a modem, network card, chipset, and/or the like. The network interface 1180 may include one or more input and/or output communication interfaces to permit data to be exchanged with a network, communication network servers, computer systems, and/or any other electronic devices described herein.

In many embodiments, the TRP 1100 may further comprise a memory 1160. The memory 1160 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1160 of the TRP 1100 also may comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the TRP 1100 (and/or processing unit(s) 1110 or DSP 1120 within TRP 1100). In an aspect, then such code and/or instructions can be used to configure and/or adapt a general-purpose computer (or other device) to perform one or more operations in accordance with the described methods.

FIG. 12 is a block diagram of an embodiment of a computer system 1200, which may be used, in whole or in part, to provide the functions of a server or other network node described herein with regard to FIGS. 1-11 and may correspond with location server 160, external client 180, LMF 220, and/or other network-connected devices described herein. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, it can be noted that components illustrated by FIG. 12 can be localized to a single device and/or distributed among various networked devices, which may be disposed at different geographical locations.

The computer system 1200 is shown comprising hardware elements that can be electrically coupled via a bus 1205 (or may otherwise be in communication, as appropriate). The hardware elements may include processing unit(s) 1210, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1200 also may comprise one or more input devices 1215, which may comprise without limitation a mouse, a keyboard, a camera, a microphone, and/or the like; and one or more output devices 1220, which may comprise without limitation a display device, a printer, and/or the like.

The computer system 1200 may further include (and/or be in communication with) one or more non-transitory storage devices 1225, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1200 may also include a communications subsystem 1230, which may comprise wireless communication technologies managed and controlled by a wireless communication interface 1233, as well as wired technologies (such as Ethernet, coaxial communications, universal serial bus (USB), and the like). The wireless communication interface 1233 may send and receive wireless signals 1255 (e.g., signals according to 5G NR or LTE) via wireless antenna(s) 1250. Thus the communications subsystem 1230 may comprise a modem, a network card (wireless or wired), an infrared communication device, a wireless communication device, and/or a chipset, and/or the like, which may enable the computer system 1200 to communicate on any or all of the communication networks described herein to any device on the respective network, including a User Equipment (UE), base stations and/or other TRPs, and/or any other electronic devices described herein. Hence, the communications subsystem 1230 may be used to receive and send data as described in the embodiments herein.

In many embodiments, the computer system 1200 will further comprise a working memory 1235, which may comprise a RAM or ROM device, as described above. Software elements, shown as being located within the working memory 1235, may comprise an operating system 1240, device drivers, executable libraries, and/or other code, such as one or more applications 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of measurement gap (MG) configuration of a first User Equipment (UE) for Sidelink Positioning Reference Signal (SL-PRS) measurements, the method comprising: determining, at a network node, information regarding a first Positioning Reference Signal (PRS) measurement to be made by the first UE, the first PRS measurement comprising an SL-PRS measurement; determining, at the network node, information regarding a second PRS measurement; determining an MG configuration, wherein: the MG configuration schedules at least one MG for at least one period of time during which during which the first UE is to make the first PRS measurement, and the MG configuration is based at least in part on the information regarding the first PRS measurement and the information regarding the second PRS measurement; and sending the MG configuration to the first UE.

Clause 2. The method of clause 1, wherein the network node comprises a location server, and wherein sending the MG configuration to the first UE comprises sending the MG configuration via a serving Transmission Reception Point (TRP) of the first UE.

Clause 3. The method of clause 1 or 2, wherein the serving TRP sends the MG configuration to the first UE using Downlink Control Information (DCI), Radio Resource Control (RRC), or Medium Access Control (MAC) Control Element (CE) (MAC-CE).

Clause 4. The method of any of clauses 1-3, wherein the location server sends the MG configuration to the serving TRP using NRPPa.

Clause 5. The method clause 1, wherein the network node comprises a second UE or a serving TRP of the first UE.

Clause 6. The method of any of clauses 1-5, wherein the second PRS measurement comprises a downlink PRS (DL-PRS) measurement to be made by the first UE.

Clause 7. The method of any of clauses 1-6, wherein the at least one MG comprises: a single MG for the first PRS measurement and the second PRS measurement, or a first MG for the first PRS measurement and a second MG for the second PRS measurement.

Clause 8. The method of any of clauses 1-5 or 7, wherein the second PRS measurement comprises a second SL-PRS measurement to be made by a second UE.

Clause 9. The method of clause 8, wherein the MG configuration schedules a first MG for first time period during which the first UE is to make the first PRS measurement, such that the first MG overlaps at least partially with a second MG during which the second UE is to make the second PRS measurement.

Clause 10. The method of any of clauses 1-9, wherein the MG configuration is additionally based on a motion report received from the first UE, and wherein the motion report is indicative of movement of the first UE.

Clause 11. The method of clause 10, wherein the motion report comprises: a speed of the first UE, an acceleration of the first UE, a heading direction of the first UE, an orientation of the first UE, a rotation speed of the first UE, a motion status of the first UE, or uncertainty value regarding a measurement of movement of the first UE, or any combination thereof.

Clause 12. The method of any of clauses 1-11, wherein the MG configuration is additionally based on an MG configuration report received from the first UE, wherein the MG configuration report is indicative of an initial MG configuration of the first UE different than the MG configuration sent to the first UE.

Clause 13. A method of measurement gap (MG) configuration of a first User Equipment (UE) for Sidelink Positioning Reference Signal (SL-PRS) measurements, the method comprising: sending, from the first UE to a network node: an MG configuration report indicative of an first MG configuration, or a motion report indicative of movement of the first UE, or both; subsequent to the sending, receiving a second MG configuration at the first UE, the second MG configuration scheduling an MG for a period of time during which an SL-PRS is to be measured; and measuring the SL-PRS in accordance with the MG configuration.

Clause 14. The method of clause 13, wherein the network node comprises a location server, a serving Transmission Reception Point (TRP) of the first UE, or a second UE.

Clause 15. The method of clause 13 or 14, comprising sending the MG configuration report to the network node, the method further comprising: receiving the first MG configuration prior to the sending, wherein the first MG configuration schedules the MG for a period of time different than the period of time scheduled by the second MG configuration.

Clause 16. The method of any of clauses 13-15, wherein the first MG configuration, the second MG configuration, or both, are received from a serving TRP of the first UE.

Clause 17. The method of any of clauses 13-16, further comprising sending the motion report to the network node, wherein the motion report is indicative of movement of the first UE.

Clause 18. The method of any of clauses 13-17, wherein the motion report comprises: a speed of the first UE, an acceleration of the first UE, a heading direction of the first UE, an orientation of the first UE, a rotation speed of the first UE, a motion status of the first UE, or uncertainty value regarding a measurement of movement of the first UE, or any combination thereof.

Clause 19. A device for providing measurement gap (MG) configuration of a first User Equipment (UE) for Sidelink Positioning Reference Signal (SL-PRS) measurements, the device comprising: a communications interface; a memory; and one or more processing units communicatively coupled with the communications interface and the memory, the one or more processing units configured to: determine information regarding a first Positioning Reference Signal (PRS) measurement to be made by the first UE, the first PRS measurement comprising an SL-PRS measurement; determine information regarding a second PRS measurement; determine an MG configuration, wherein: the MG configuration schedules at least one MG for at least one period of time during which during which the first UE is to make the first PRS measurement, and the MG configuration is based at least in part on the information regarding the first PRS measurement and the information regarding the second PRS measurement; and send, with the communications interface, the MG configuration to the first UE.

Clause 20. The device of clause 19, wherein the device comprises a location server, and wherein, to send the MG configuration to the first UE, the one or more processing units are configured to send the MG configuration via a serving Transmission Reception Point (TRP) of the first UE.

Clause 21. The device of clause 19 or 20, wherein the one or more processing units are further configured to send the MG configuration to the serving TRP using NRPPa.

Clause 22. The device of clause 19, wherein the device comprises a second UE or a serving TRP of the first UE.

Clause 23. The device of any of clauses 19-22, wherein the second PRS measurement comprises a downlink PRS (DL-PRS) measurement to be made by the first UE.

Clause 24. The device of any of clauses 19-23, wherein the at least one MG comprises: a single MG for the first PRS measurement and the second PRS measurement, or a first MG for the first PRS measurement and a second MG for the second PRS measurement.

Clause 25. The device of any of clauses 19-22 or 24, wherein the second PRS measurement comprises a second SL-PRS measurement to be made by a second UE.

Clause 26. The device of any of clauses 25, wherein the MG configuration schedules a first MG for first time period during which the first UE is to make the first PRS measurement, such that the first MG overlaps at least partially with a second MG during which the second UE is to make the second PRS measurement.

Clause 27. The device of any of clauses 19-26, wherein the one or more processing units are configured to additionally base send MG configuration on a motion report received from the first UE, and wherein the motion report is indicative of movement of the first UE.

Clause 28. The device of any of clauses 27, wherein the one or more processing units are configured to determine, from the motion report: a speed of the first UE, an acceleration of the first UE, a heading direction of the first UE, an orientation of the first UE, a rotation speed of the first UE, a motion status of the first UE, or uncertainty value regarding a measurement of movement of the first UE, or any combination thereof.

Clause 29. The device of any of clauses 19-28, wherein the one or more processing units are configured to additionally base the MG configuration on an MG configuration report received from the first UE, wherein the MG configuration report is indicative of an initial MG configuration of the first UE different than the MG configuration sent to the first UE.

Clause 30. A first User Equipment (UE) configured to obtain measurement gap (MG) configuration for Sidelink Positioning Reference Signal (SL-PRS) measurements, the first UE comprising: a wireless communication interface; a memory; and one or more processing units communicatively coupled with the wireless communication interface and the memory, the one or more processing units configured to: send to a network node via the wireless communication interface: an MG configuration report indicative of an first MG configuration, or a motion report indicative of movement of the first UE, or both; subsequent to the sending, receive a second MG configuration via the wireless communication interface, the second MG configuration scheduling an MG for a period of time during which an SL-PRS is to be measured; and measure the SL-PRS in accordance with the MG configuration.

Clause 31. The first UE of clause 30, wherein the network node comprises a location server, a serving Transmission Reception Point (TRP) of the first UE, or a second UE.

Clause 32. The first UE of clause 30 or 31, wherein the one or more processing units are further configured to receive the first MG configuration prior to the sending, wherein the first MG configuration schedules the MG for a period of time different than the period of time scheduled by the second MG configuration.

Clause 33. The first UE of any of clauses 30-32, wherein the one or more processing units are further configured to receive the first MG configuration, the second MG configuration, or both, from a serving TRP of the first UE.

Clause 34. The first UE of any of clauses 30-33, wherein the one or more processing units are further configured to include, in the motion report, information indicative of: a speed of the first UE, an acceleration of the first UE, a heading direction of the first UE, an orientation of the first UE, a rotation speed of the first UE, a motion status of the first UE, or uncertainty value regarding a measurement of movement of the first UE, or any combination thereof.

Clause 35. A device comprising: means for determining, at a network node, information regarding a first Positioning Reference Signal (PRS) measurement to be made by a first User Equipment (UE), the first PRS measurement comprising an Sidelink Positioning Reference Signal (SL-PRS) measurement; means for determining information regarding a second PRS measurement; means for determining a measurement gap (MG) configuration, wherein: the MG configuration schedules at least one MG for at least one period of time during which during which the first UE is to make the first PRS measurement, and the MG configuration is based at least in part on the information regarding the first PRS measurement and the information regarding the second PRS measurement; and means for sending the MG configuration to the first UE.

Clause 36. The device of clause 35, wherein the device comprises a location server, and wherein the means for sending the MG configuration to the first UE comprise means for sending the MG configuration via a serving Transmission Reception Point (TRP) of the first UE.

Clause 37. The device of clause 35 or 36, wherein the means for sending the MG configuration to the serving TRP comprise means for sending the MG configuration using NRPPa.

Clause 38. The device of clause 35, wherein the device comprises a second UE or a serving TRP of the first UE.

Clause 39. The device of any of clauses 35-38, wherein the second PRS measurement comprises a downlink PRS (DL-PRS) measurement to be made by the first UE.

Clause 40. The device of any of clauses 35-39, wherein the at least one MG comprises: a single MG for the first PRS measurement and the second PRS measurement, or a first MG for the first PRS measurement and a second MG for the second PRS measurement.

Clause 41. The device of any of clauses 35-38 or 40, wherein the second PRS measurement comprises a second SL-PRS measurement to be made by a second UE.

Clause 42. The device of clause 41, wherein the MG configuration schedules a first MG for first time period during which the first UE is to make the first PRS measurement, such that the first MG overlaps at least partially with a second MG during which the second UE is to make the second PRS measurement.

Clause 43. The device of any of clauses 35-42, wherein the MG configuration is additionally based on a motion report received from the first UE, and wherein the motion report is indicative of movement of the first UE.

Clause 44. The device of clause 43, wherein the motion report comprises: a speed of the first UE, an acceleration of the first UE, a heading direction of the first UE, an orientation of the first UE, a rotation speed of the first UE, a motion status of the first UE, or uncertainty value regarding a measurement of movement of the first UE, or any combination thereof.

Clause 45. The device of any of clauses 35-44, wherein the means for determining the MG configuration additionally base the MG configuration on an MG configuration report received from the first UE, wherein the MG configuration report is indicative of an initial MG configuration of the first UE different than the MG configuration sent to the first UE.

Clause 46. A device comprising: means for sending, to a network node: a measurement gap (MG) configuration report indicative of an first MG configuration, or a motion report indicative of movement of a first UE, or both; means for receiving, subsequent to the sending, a second MG configuration at the first UE, the second MG configuration scheduling an MG for a period of time during which a Sidelink Positioning Reference Signal (SL-PRS) is to be measured; and means for measuring the SL-PRS in accordance with the MG configuration.

Clause 47. The device of clause 46, wherein the network node comprises a location server, a serving Transmission Reception Point (TRP) of the first UE, or a second UE.

Clause 48. The device of clause 46 or 47, further comprising means for receiving the first MG configuration prior to the sending, wherein the first MG configuration schedules the MG for a period of time different than the period of time scheduled by the second MG configuration.

Clause 49. The device of any of clauses 46-48, further comprising means for receiving the first MG configuration, the second MG configuration, or both, from a serving TRP of the first UE.

Clause 50. The device of any of clauses 46-49, further comprising means for including, in the motion report, information indicative of: a speed of the first UE, an acceleration of the first UE, a heading direction of the first UE, an orientation of the first UE, a rotation speed of the first UE, a motion status of the first UE, or uncertainty value regarding a measurement of movement of the first UE, or any combination thereof.

Clause 51. A non-transitory computer-readable medium storing instructions for measurement gap (MG) configuration of a first User Equipment (UE) for Sidelink Positioning Reference Signal (SL-PRS) measurements, the instructions comprising code for: determining information regarding a first Positioning Reference Signal (PRS) measurement to be made by the first UE, the first PRS measurement comprising an SL-PRS measurement; determining information regarding a second PRS measurement; determining an MG configuration, wherein: the MG configuration schedules at least one MG for at least one period of time during which during which the first UE is to make the first PRS measurement, and the MG configuration is based at least in part on the information regarding the first PRS measurement and the information regarding the second PRS measurement; and sending the MG configuration to the first UE.

Clause 52. The non-transitory computer-readable medium of clause 51, wherein the code for sending the MG configuration to the first UE comprises code for sending the MG configuration via a serving Transmission Reception Point (TRP) of the first UE.

Clause 53. The non-transitory computer-readable medium of clause 51 or 52, wherein the code for sending the MG configuration via a serving Transmission Reception Point (TRP) comprises code for sending the MG configuration to the serving TRP using NRPPa.

Clause 54. The non-transitory computer-readable medium of any of clauses 51-53, wherein the second PRS measurement comprises a downlink PRS (DL-PRS) measurement to be made by the first UE.

Clause 55. The non-transitory computer-readable medium of any of clauses 51-54, wherein the at least one MG comprises: a single MG for the first PRS measurement and the second PRS measurement, or a first MG for the first PRS measurement and a second MG for the second PRS measurement.

Clause 56. The non-transitory computer-readable medium of any of clauses 51-53 or 55, wherein the second PRS measurement comprises a second SL-PRS measurement to be made by a second UE.

Clause 57. The non-transitory computer-readable medium of any of clauses 51-56, wherein the MG configuration schedules a first MG for first time period during which the first UE is to make the first PRS measurement, such that the first MG overlaps at least partially with a second MG during which the second UE is to make the second PRS measurement.

Clause 58. The non-transitory computer-readable medium of clause 51-57, wherein the MG configuration is additionally based on a motion report received from the first UE, and wherein the motion report is indicative of movement of the first UE.

Clause 59. The non-transitory computer-readable medium of any of clauses 51-58, wherein the instructions further comprise code for determining, from the motion report: a speed of the first UE, an acceleration of the first UE, a heading direction of the first UE, an orientation of the first UE, a rotation speed of the first UE, a motion status of the first UE, or uncertainty value regarding a measurement of movement of the first UE, or any combination thereof.

Clause 60. The non-transitory computer-readable medium of any of clauses 59, wherein the MG configuration is additionally based on an MG configuration report received from the first UE, wherein the MG configuration report is indicative of an initial MG configuration of the first UE different than the MG configuration sent to the first UE.

Clause 61. A non-transitory computer-readable medium storing instructions for measurement gap (MG) configuration of a first User Equipment (UE) for Sidelink Positioning Reference Signal (SL-PRS) measurements, the instructions comprising code for: sending, from the first UE to a network node: an MG configuration report indicative of an first MG configuration, or a motion report indicative of movement of the first UE, or both; subsequent to the sending, receiving a second MG configuration at the first UE, the second MG configuration scheduling an MG for a period of time during which an SL-PRS is to be measured; and measuring the SL-PRS in accordance with the MG configuration.

Clause 62. The non-transitory computer-readable medium of clause 61, wherein the network node comprises a location server, a serving Transmission Reception Point (TRP) of the first UE, or a second UE.

Clause 63. The non-transitory computer-readable medium of clause 61 or 62, wherein the instructions further comprise code for receiving the first MG configuration prior to the sending, wherein the first MG configuration schedules the MG for a period of time different than the period of time scheduled by the second MG configuration.

Clause 64. The non-transitory computer-readable medium of any of clauses 61-63, wherein the instructions further comprise code for receiving the first MG configuration, the second MG configuration, or both, from a serving TRP of the first UE.

Clause 65. The non-transitory computer-readable medium of any of clauses 61-64, wherein the instructions further comprise code for sending the motion report to the network node, wherein the motion report is indicative of movement of the first UE.

Clause 66. The non-transitory computer-readable medium of any of clauses 61-65, wherein the instructions further comprise code for including, in the motion report, information indicative of: a speed of the first UE, an acceleration of the first UE, a heading direction of the first UE, an orientation of the first UE, a rotation speed of the first UE, a motion status of the first UE, or uncertainty value regarding a measurement of movement of the first UE, or any combination thereof.

What is claimed is:

1. A method of measurement gap (MG) configuration of a first User Equipment (UE) for Sidelink Positioning Reference Signal (SL-PRS) measurements, the method comprising:
   determining, at a network node, an initial MG configuration of the first UE regarding a first Positioning Reference Signal (PRS) measurement to be made by the first UE, the first PRS measurement comprising an SL-PRS measurement, wherein the initial MG configuration is configured for determining a downlink PRS (DL-PRS) measurement;
   receiving, from the first UE, an MG configuration report indicative of a PRS processing capability of the first UE;
   determining, at the network node, information regarding a second PRS measurement;
   determining a SL-PRS MG configuration, wherein:
      the SL-PRS MG configuration schedules at least one MG for at least one period of time during which the first UE is to make the first PRS measurement, and
      the SL-PRS MG configuration is based at least in part on the initial MG configuration, the PRS processing capability of the first UE, and the information regarding the second PRS measurement; and
   sending the MG configuration to the first UE.

2. The method of claim 1, wherein the network node comprises a location server, and wherein sending the SL-PRS MG configuration to the first UE comprises sending the SL-PRS MG configuration via a serving Transmission Reception Point (TRP) of the first UE.

3. The method of claim 2, wherein the serving TRP sends the SL-PRS MG configuration to the first UE using Downlink Control Information (DCI), Radio Resource Control (RRC), or Medium Access Control (MAC) Control Element (CE) (MAC-CE).

4. The method of claim 2, wherein the location server sends the SL-PRS MG configuration to the serving TRP using New Radio Positioning Protocol A (NRPPa).

5. The method of claim 1, wherein the network node comprises a second UE or a serving TRP of the first UE.

6. The method of claim 1, wherein the second PRS measurement comprises a downlink PRS (DL-PRS) measurement to be made by the first UE.

7. The method of claim 1, wherein the at least one MG comprises:
   a single MG for the first PRS measurement and the second PRS measurement, or
   a first MG for the first PRS measurement and a second MG for the second PRS measurement.

8. The method of claim 1, wherein the second PRS measurement comprises a second SL-PRS measurement to be made by a second UE.

9. The method of claim 8, wherein the SL-PRS MG configuration schedules a first MG for a first time period during which the first UE is to make the first PRS measurement, such that the first MG overlaps at least partially with a second MG during which the second UE is to make the second PRS measurement.

10. The method of claim 1, wherein the SL-PRS MG configuration is additionally based on a motion report received from the first UE, and wherein the motion report is indicative of movement of the first UE.

11. The method of claim 10, wherein the motion report comprises:
   a speed of the first UE,
   an acceleration of the first UE,
   a heading direction of the first UE,
   an orientation of the first UE,
   a rotation speed of the first UE,
   a motion status of the first UE, or
   uncertainty value regarding a measurement of movement of the first UE, or
   any combination thereof.

12. The method of claim 1, wherein the MG configuration report is indicative of the initial MG configuration of the first UE different than the SL-PRS MG configuration sent to the first UE.

13. A method of measurement gap (MG) configuration of a first User Equipment (UE) for Sidelink Positioning Reference Signal (SL-PRS) measurements, the method comprising:
   sending, from the first UE to a network node:
      an MG configuration report indicative of a first MG configuration;
   subsequent to the sending, receiving a second MG configuration determined based on the first MG configuration at the first UE and an initial MG configuration for determining a downlink PRS (DL-PRS) measurement, the second MG configuration scheduling an MG for a period of time during which an SL-PRS is to be measured; and measuring the SL-PRS in accordance with the second MG configuration.

14. The method of claim 13, wherein the network node comprises a location server, a serving Transmission Reception Point (TRP) of the first UE, or a second UE.

15. The method of claim 13, the method further comprising:
receiving the first MG configuration prior to the sending of the MG configuration report, wherein the first MG configuration schedules the MG for a period of time different than the period of time scheduled by the second MG configuration.

16. The method of claim 13, wherein the first MG configuration, the second MG configuration, or both, are received from a serving TRP of the first UE.

17. The method of claim 13, further comprising sending a motion report to the network node, wherein the motion report is indicative of movement of the first UE.

18. The method of claim 17, wherein the motion report comprises:
a speed of the first UE,
an acceleration of the first UE,
a heading direction of the first UE,
an orientation of the first UE,
a rotation speed of the first UE,
a motion status of the first UE, or
uncertainty value regarding a measurement of movement of the first UE, or
any combination thereof.

19. A device for providing measurement gap (MG) configuration of a first User Equipment (UE) for Sidelink Positioning Reference Signal (SL-PRS) measurements, the device comprising:
a communications interface;
a memory; and
one or more processing units communicatively coupled with the communications interface and the memory, the one or more processing units configured to:
determine an initial MG configuration of the first UE regarding a first Positioning Reference Signal (PRS) measurement to be made by the first UE, the first PRS measurement comprising an SL-PRS measurement, wherein the initial MG configuration is configured for determining a downlink PRS (DL-PRS) measurement;
receive, from the first UE, an MG configuration report indicative of a PRS processing capability of the first UE;
determine information regarding a second PRS measurement;
determine a SL-PRS MG configuration, wherein:
the SL-PRS MG configuration schedules at least one MG for at least one period of time during which the first UE is to make the first PRS measurement, and
the SL-PRS MG configuration is based at least in part on the initial MG configuration, the PRS processing capability of the first UE, and the information regarding the second PRS measurement; and
send, with the communications interface, the MG configuration to the first UE.

20. The device of claim 19, wherein the device comprises a location server, and wherein, to send the SL-PRS MG configuration to the first UE, the one or more processing units are configured to send the SL-PRS MG configuration via a serving Transmission Reception Point (TRP) of the first UE.

21. The device of claim 19, wherein the device comprises a second UE or a serving TRP of the first UE.

22. The device of claim 19, wherein the second PRS measurement comprises a downlink PRS (DL-PRS) measurement to be made by the first UE.

23. The device of claim 19, wherein the at least one MG comprises:
a single MG for the first PRS measurement and the second PRS measurement, or
a first MG for the first PRS measurement and a second MG for the second PRS measurement.

24. The device of claim 19, wherein the second PRS measurement comprises a second SL-PRS measurement to be made by a second UE.

25. The device of claim 19, wherein the one or more processing units are configured to additionally base sending the SL-PRS MG configuration on a motion report received from the first UE, and wherein the motion report is indicative of:
a speed of the first UE,
an acceleration of the first UE,
a heading direction of the first UE,
an orientation of the first UE,
a rotation speed of the first UE,
a motion status of the first UE, or
uncertainty value regarding a measurement of movement of the first UE, or
any combination thereof.

26. The device of claim 19, wherein the one or more processing units are configured to additionally base the SL-PRS MG configuration on an MG configuration report received from the first UE, wherein the MG configuration report is indicative of the initial MG configuration of the first UE different than the SL-PRS MG configuration sent to the first UE.

27. A first User Equipment (UE) configured to obtain measurement gap (MG) configuration for Sidelink Positioning Reference Signal (SL-PRS) measurements, the first UE comprising:
a wireless communication interface;
a memory; and
one or more processing units communicatively coupled with the wireless communication interface and the memory, the one or more processing units configured to:
send to a network node via the wireless communication interface:
an MG configuration report indicative of a first MG configuration;
subsequent to the sending, receive a second MG configuration determined based on the first MG configuration and an initial MG configuration for determining a downlink PRS (DL-PRS) measurement via the wireless communication interface, the second MG configuration scheduling an MG for a period of time during which an SL-PRS is to be measured; and
measure the SL-PRS in accordance with the second MG configuration.

28. The first UE of claim 27, wherein the network node comprises a location server, a serving Transmission Reception Point (TRP) of the first UE, or a second UE.

29. The first UE of claim 27, wherein the one or more processing units are further configured to receive the first MG configuration prior to the sending of the MG configuration report, wherein the first MG configuration schedules the MG for a period of time different than the period of time scheduled by the second MG configuration.

30. The first UE of claim 27, wherein the one or more processing units are further configured to receive the first MG configuration, the second MG configuration, or both, from a serving TRP of the first UE.

* * * * *